(12) United States Patent
Uchiyama

(10) Patent No.: US 9,678,833 B2
(45) Date of Patent: Jun. 13, 2017

(54) STORAGE CONTROLLER, STORAGE SYSTEM AND STORAGE CONTROL METHOD

(71) Applicant: FUJITSU LIMITED, Kawasaki-shi, Kanagawa (JP)

(72) Inventor: Kenji Uchiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 200 days.

(21) Appl. No.: 14/525,569

(22) Filed: Oct. 28, 2014

(65) Prior Publication Data

US 2015/0220397 A1 Aug. 6, 2015

(30) Foreign Application Priority Data

Jan. 31, 2014 (JP) ................................ 2014-017332

(51) Int. Cl.
*G06F 11/00* (2006.01)
*G06F 11/10* (2006.01)

(52) U.S. Cl.
CPC ...... *G06F 11/1096* (2013.01); *G06F 11/1076* (2013.01); *G06F 2211/108* (2013.01); *G06F 2211/1021* (2013.01); *G06F 2211/1052* (2013.01)

(58) Field of Classification Search
CPC ............. G06F 11/1096; G06F 11/1076; G06F 2211/1021; G06F 2211/1052; G06F 2211/108
See application file for complete search history.

(56) References Cited

U.S. PATENT DOCUMENTS

| 5,832,523 | A | 11/1998 | Kanai et al. |
| 2004/0123062 | A1* | 6/2004 | Dalal ............... G06F 3/0605 711/170 |
| 2006/0107097 | A1* | 5/2006 | Zohar ............ G06F 11/1096 714/6.24 |
| 2009/0327604 | A1* | 12/2009 | Sato ............... G06F 3/0614 711/114 |
| 2011/0145638 | A1 | 6/2011 | Syrgabekov et al. |
| 2013/0246886 | A1 | 9/2013 | Uchiyama |

FOREIGN PATENT DOCUMENTS

| JP | 9-128163 | 5/1997 |
| JP | 9-218753 | 8/1997 |
| JP | 2012-501508 | 1/2012 |
| JP | 2013-196318 | 9/2013 |

* cited by examiner

Primary Examiner — Bryce Bonzo
Assistant Examiner — Jonathan Gibson
(74) Attorney, Agent, or Firm — Staas & Halsey LLP

(57) ABSTRACT

A storage controller, when writing n sets of data into a first storage device, adds dummy data to other sets of data except for a first set of data having a largest size among the n sets of data such that sizes of other sets of data become equal to the size of the first set of data, calculates (n−1) parities based on the first set of data and the other sets of data, and when reading the n sets of data from the first storage device, concurrently performs a processing of reading a second set of data having a smallest size among the n sets of data from the first storage device and a processing of restoring each of two or more sets of data in the n sets of data except for the second set of data, by using the (n−1) parities and the dummy data.

11 Claims, 25 Drawing Sheets

FIG. 15
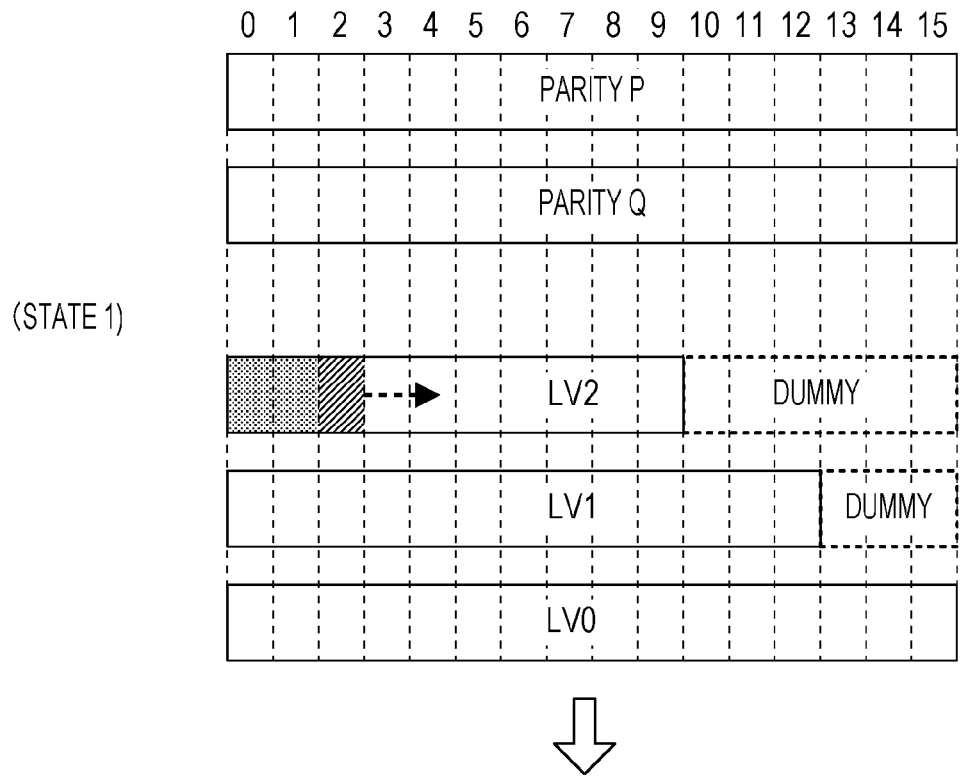
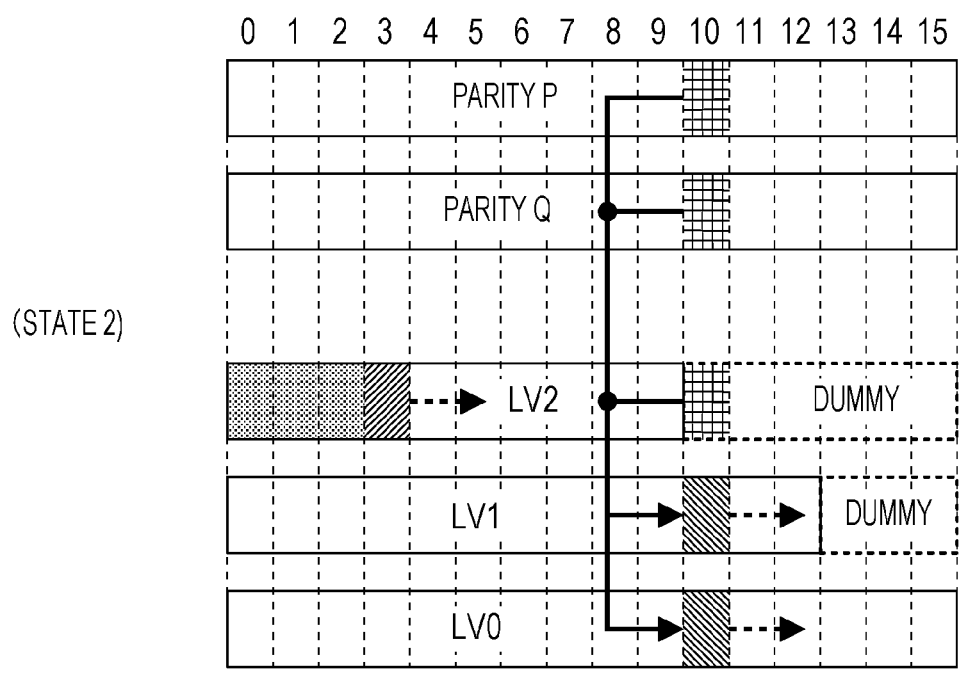

FIG. 16
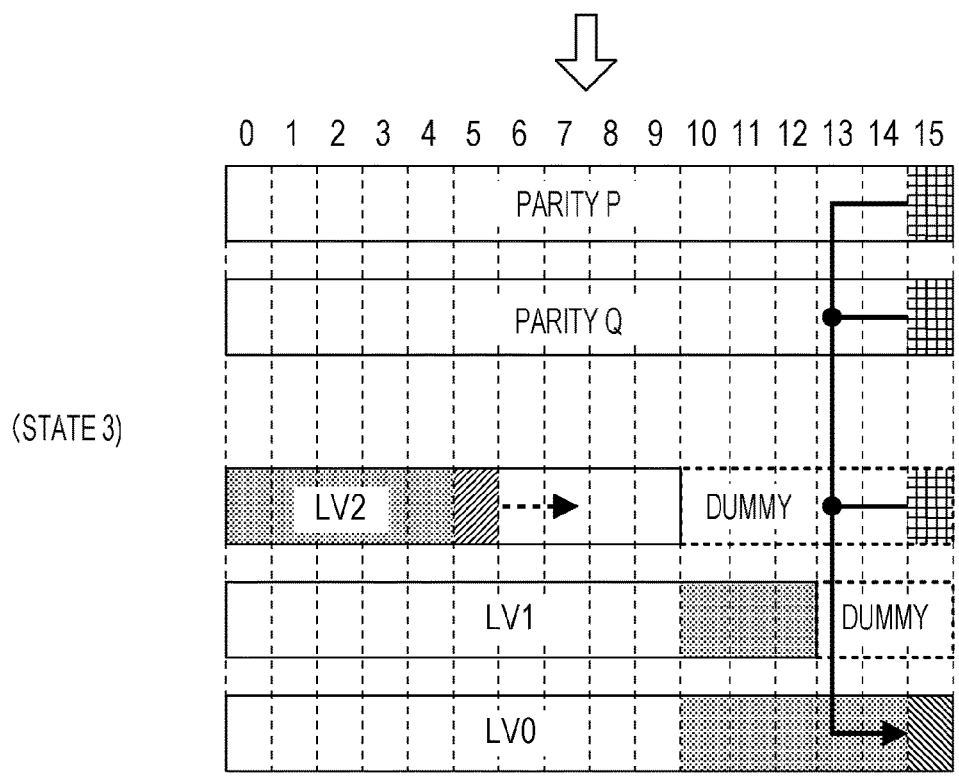
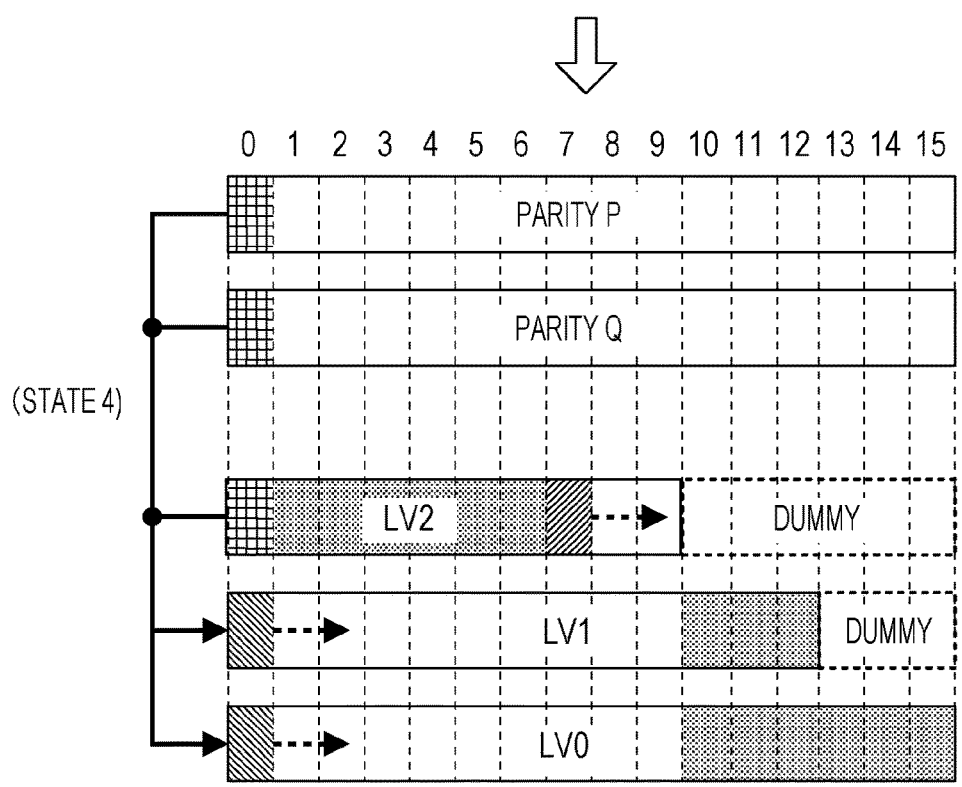

FIG. 17
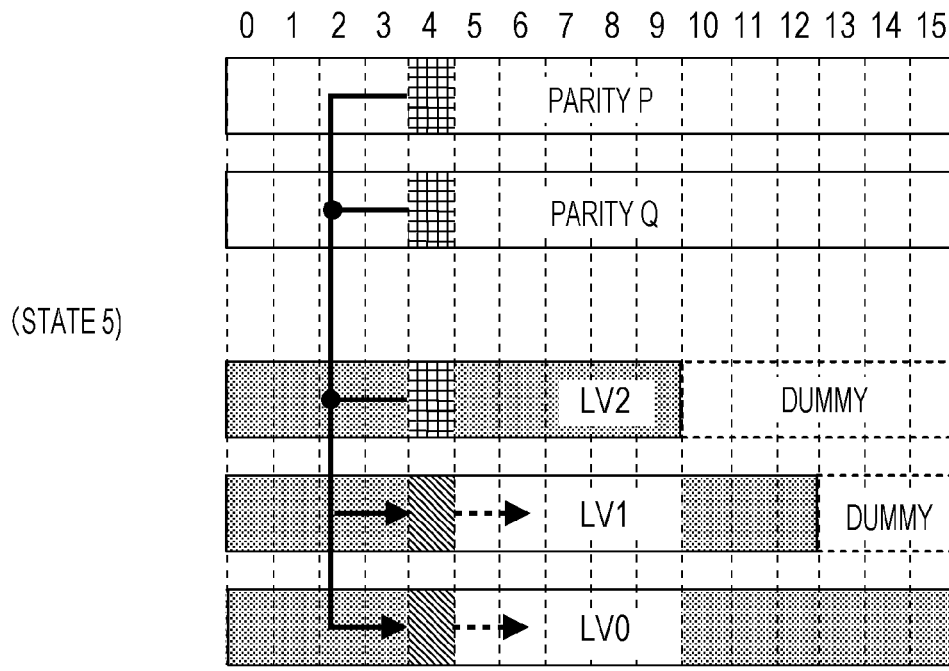
(STATE 5)
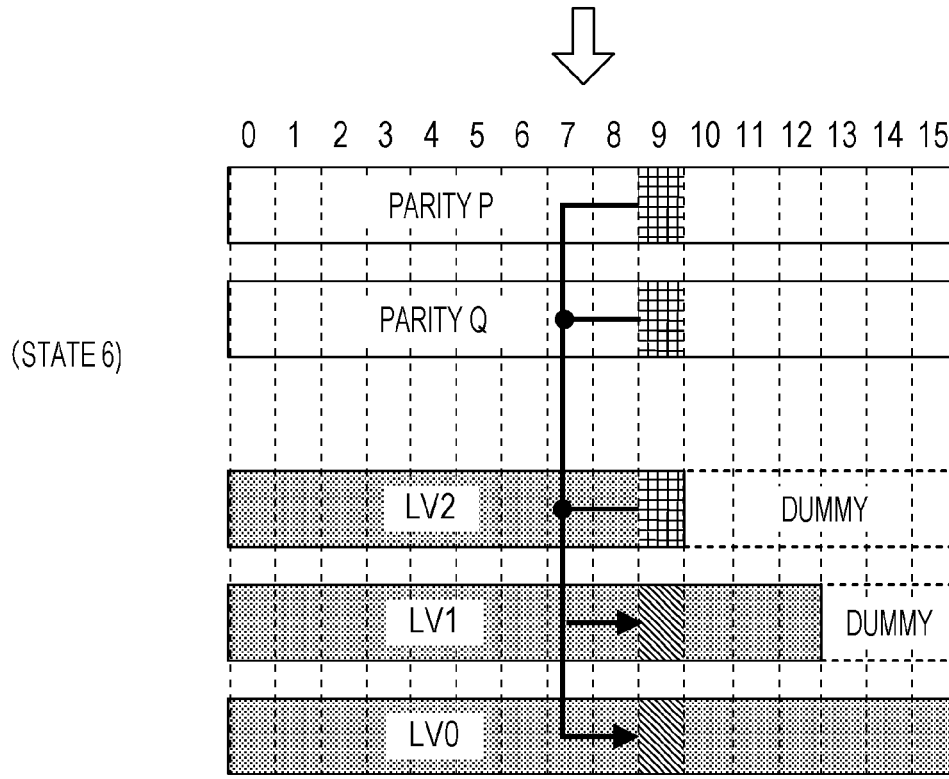
(STATE 6)

FIG. 22
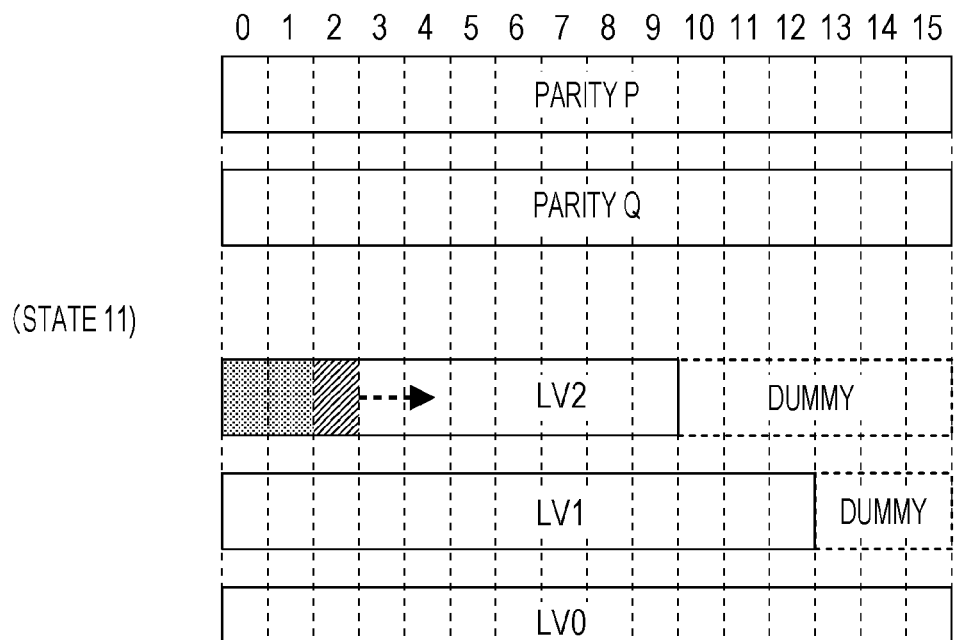
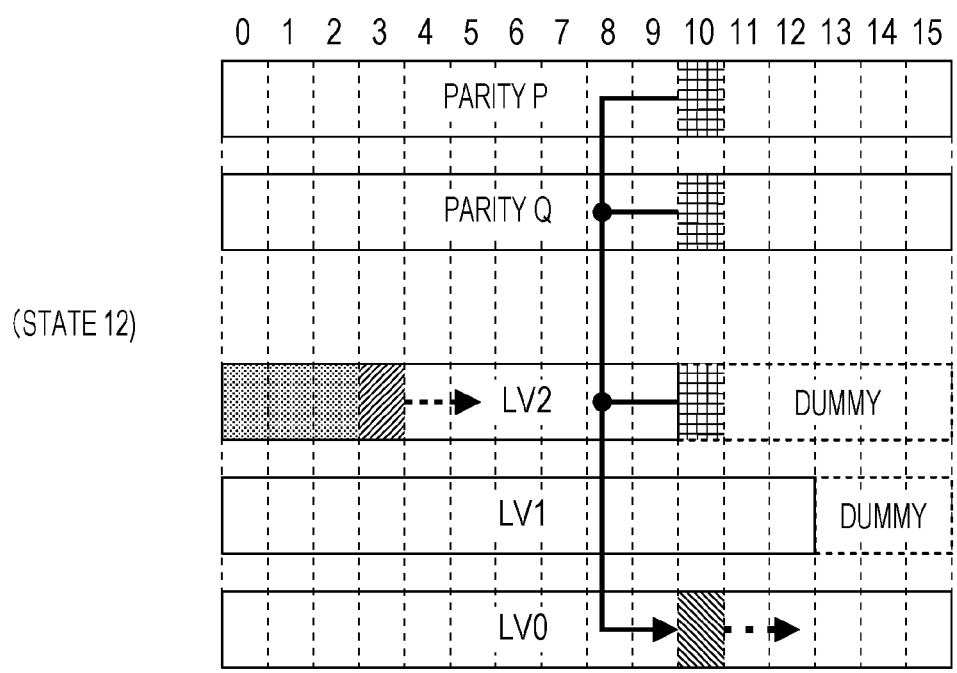

FIG. 23
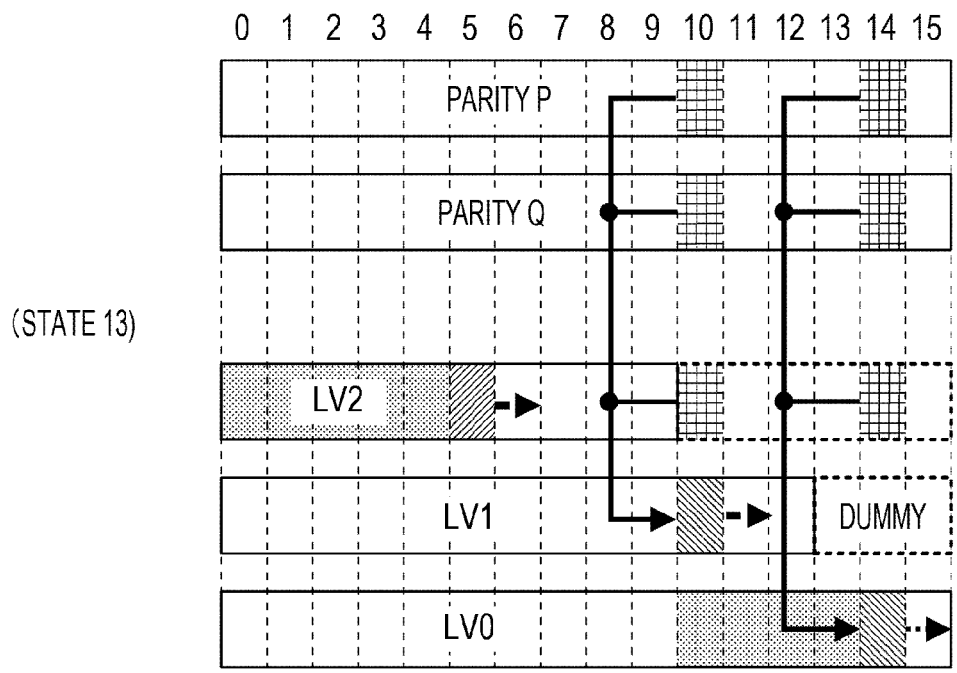
(STATE 13)
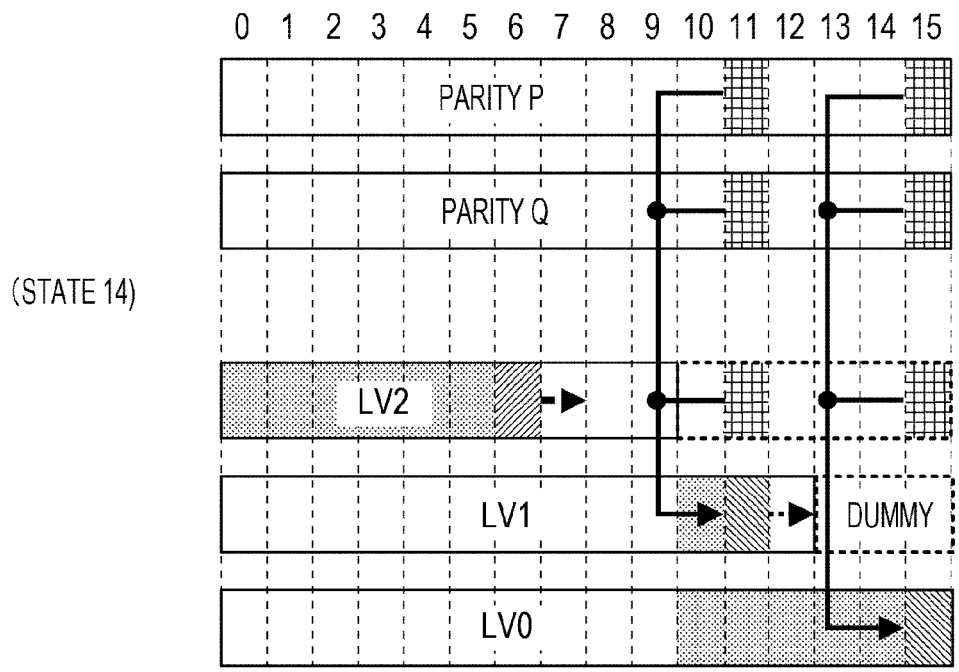
(STATE 14)

FIG. 24
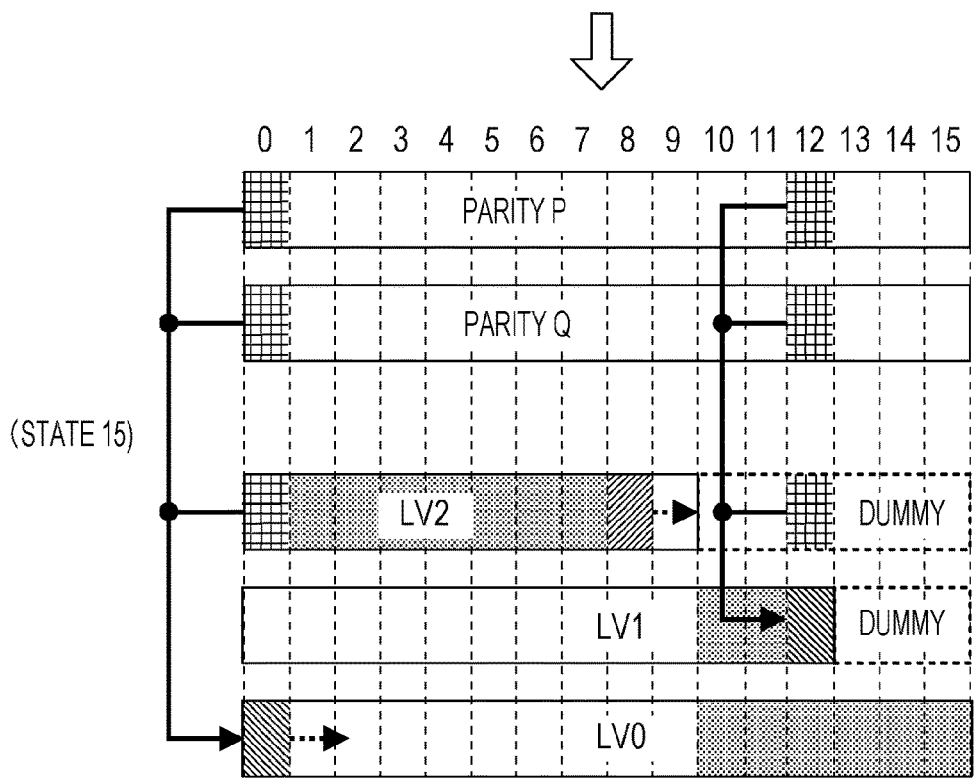
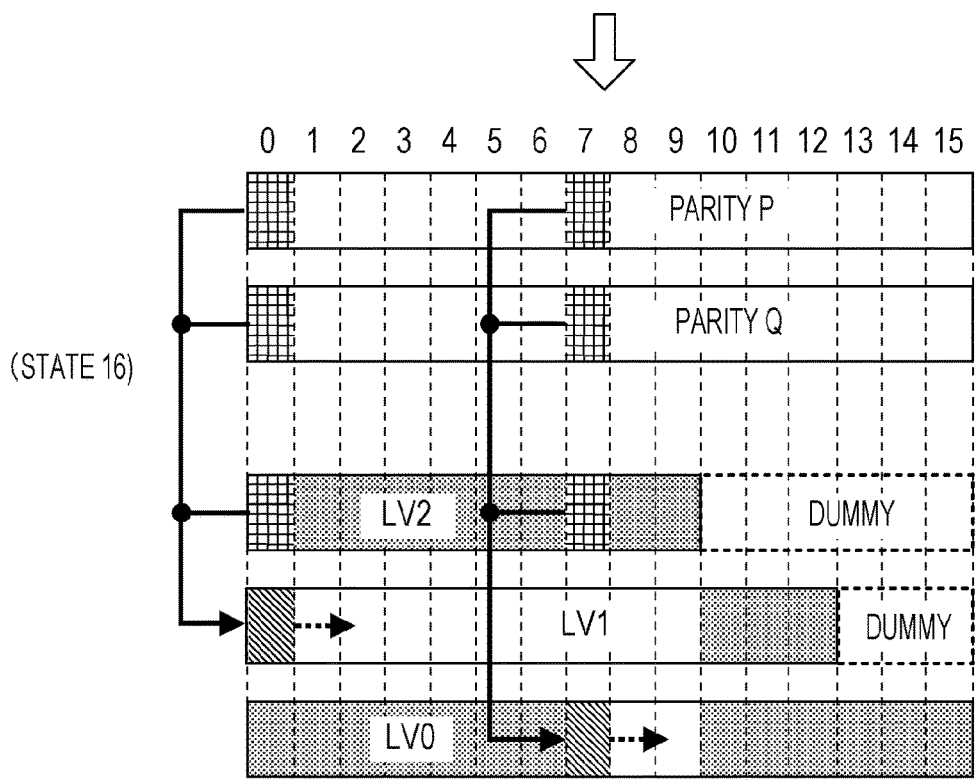

FIG. 25
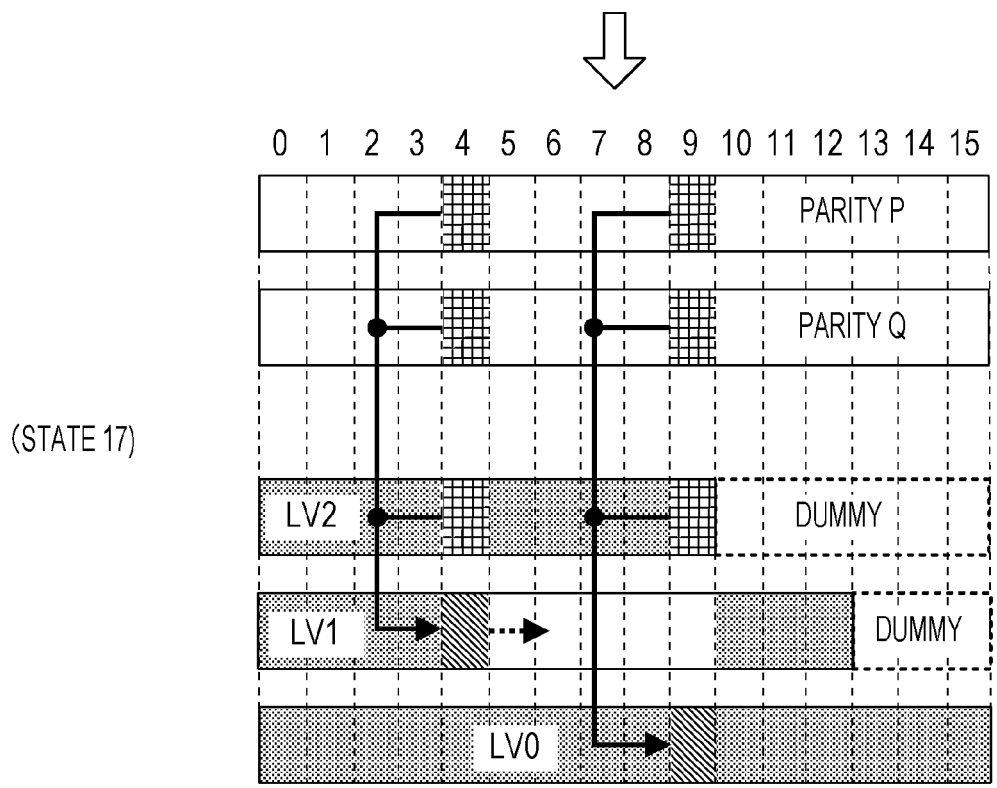
(STATE 17)
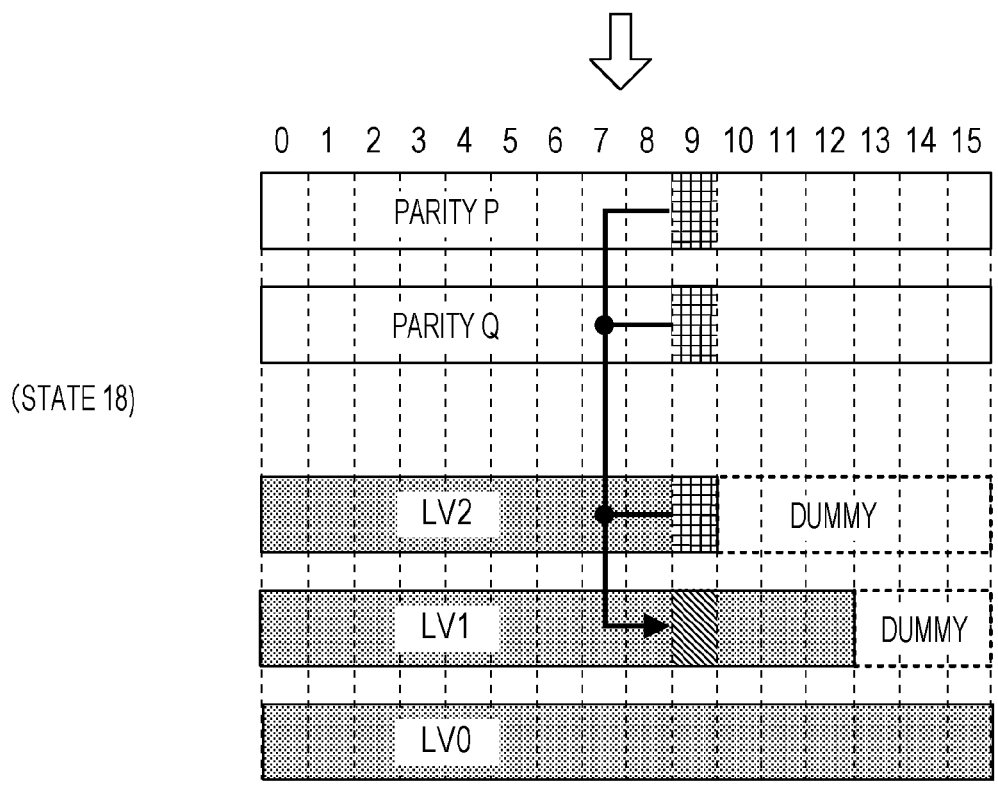
(STATE 18)

STORAGE CONTROLLER, STORAGE SYSTEM AND STORAGE CONTROL METHOD

CROSS-REFERENCE TO RELATED APPLICATION

This application is based upon and claims the benefit of priority of the prior Japanese Patent Application No. 2014-017332, filed on Jan. 31, 2014, the entire contents of which are incorporated herein by reference.

FIELD

The embodiments discussed herein are related to a storage controller, a storage system, and a storage control method.

BACKGROUND

In recent years, a hierarchical virtual storage system has been known which uses high capacity and less expensive recording media such as magnetic tapes as a library device, and a recording medium accessible at a higher speed such as a hard disk drive (HDD) as a cache device. The virtual storage system is provided with a controller device configured to control accesses to the cache device and the library device, and the controller device causes a host device to virtually recognize data stored in the cache device as data of the library device. With such configuration, the host device can use a high-capacity storage region provided by the library device as if the region was connected to the host device itself (see Japanese Laid-open Patent Publication No. 2013-196318).

Meanwhile, a technique for making data redundant by using a parity has been known as a technique for averting loss of data stored in a storage system or the like. As an example of such technique, there is an apparatus in which multiple disk devices forming a parity group and a single storage device not included in the parity group are connected to the same channel, the apparatus configured to, during data transfer to the single storage device, read data restored by using data in the disk devices in the parity group and the parity (see Japanese Laid-open Patent Publication No. H09-218753). Further, there is a system configured to divide data into multiple data subsets (segments), generate parity data from the multiple data subsets, and regenerate one or more of the multiple data subsets by using the other data subsets and the generated parity data (see Japanese National Publication of International Patent Application No. 2012-501508).

Also, the following storage controller has been proposed which is configured to reduce data read time by using parity. When writing multiple data into a magnetic tape, the storage controller stores parity calculated based on the multiple data into a storage device accessible faster than the magnetic tape. Then, when reading the multiple data from the magnetic tape, the storage controller reads first data from the magnetic tape, and concurrently restores second data by using an already-read data region in the first data and the parity within the storage device (Japanese Laid-open Patent Publication No. 2013-196318).

However, the storage controller, which reduces the data read time by using parity, may not start restoration of the second data without a time interval after the start of reading the first data from the magnetic tape. As seen from the above, the later the restoration of the second data starts, the shorter the duration in which reading of the first data and restoration of the second data are performed concurrently. Consequently, there is a problem that it takes a long time to read all the desired data.

SUMMARY

According to an aspect of the invention, a storage controller includes a parity calculation unit that, when writing n sets of data (n is an integer of three or more) into a first storage device, adds dummy data to other sets of data except for a first set of data having a largest size among the n sets of data such that sizes of other sets of data become equal to the size of the first set of data, calculates (n−1) parities based on the first set of data and the other sets of data to which the dummy data is added, and stores the (n−1) parities into a second storage device, and a controller unit that, when reading the n sets of data from the first storage device, concurrently performs a processing of reading a second set of data having a smallest size among the n sets of data from the first storage device, and a processing of restoring each of two or more sets of data in the n sets of data except for the second set of data, by using the (n−1) parities and the dummy data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 illustrates specific examples (1) of a read processing and a restoration processing of a logical volume group according to the second embodiment;

FIG. 16 illustrates specific examples (2) of the read processing and the restoration processing of the logical volume group according to the second embodiment;

FIG. 17 illustrates specific examples (3) of the read processing and the restoration processing of the logical volume group according to the second embodiment;

FIG. 22 illustrates specific examples (1) of a read processing and a restoration processing of a logical volume group according to the third embodiment;

FIG. 23 illustrates specific examples (2) of the read processing and the restoration processing of the logical volume group according to the third embodiment;

FIG. 24 illustrates specific examples (3) of the read processing and the restoration processing of the logical volume group according to the third embodiment; and FIG. 25 illustrates specific examples (4) of the read processing and the restoration processing of the logical volume group according to the third embodiment.

DESCRIPTION OF EMBODIMENTS

Hereinafter, embodiments are described with reference to the accompanying drawings.

First Embodiment

Figure 1:
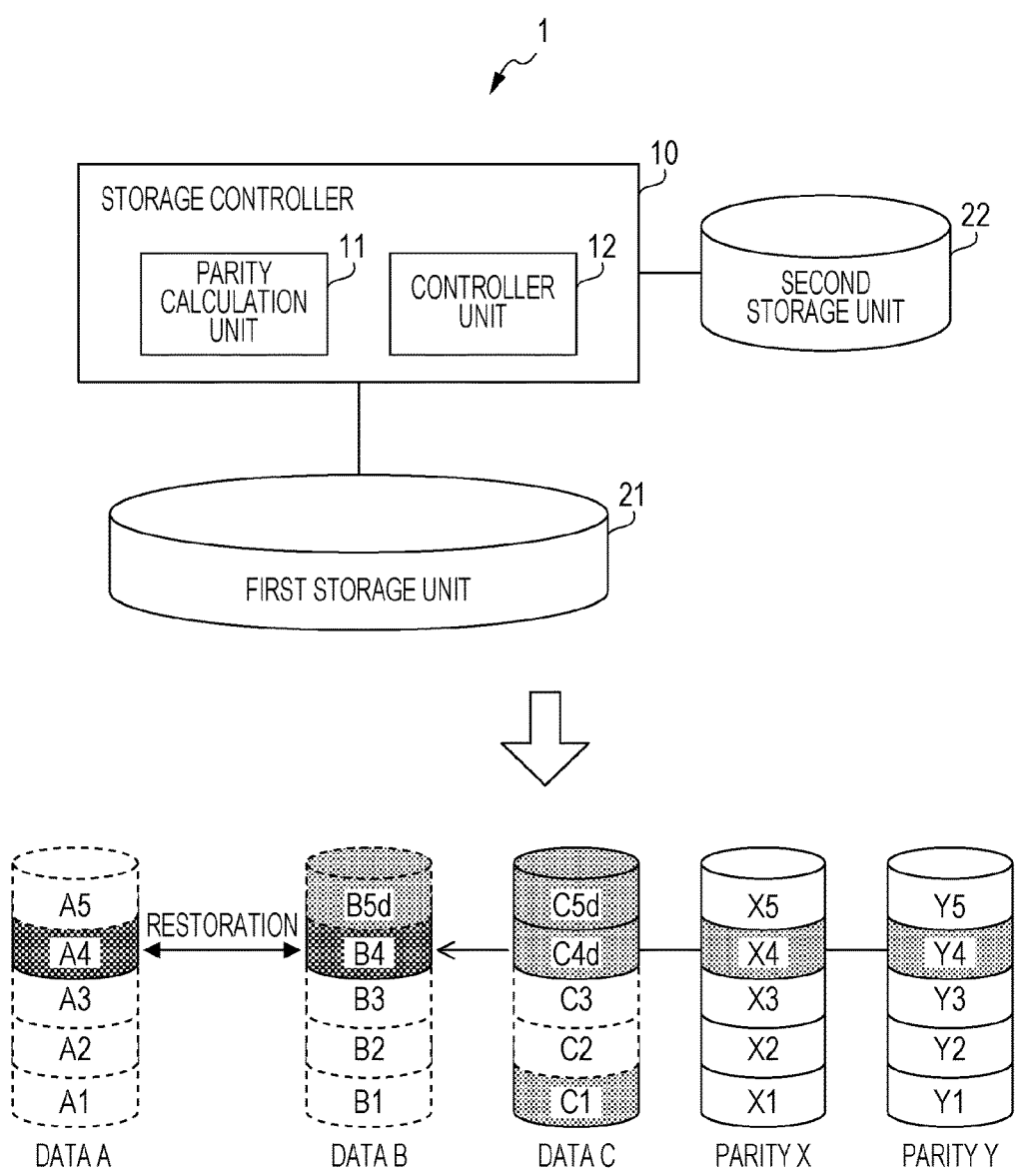
FIG. 1 illustrates a storage system according to a first embodiment.

FIG. 1 illustrates a storage system 1 according to a first embodiment. The storage system 1 includes a storage controller 10, a first storage unit 21, and a second storage unit 22.

The storage controller 10 is configured to control data write into the first storage unit 21, and data read from the first storage unit 21. The storage controller 10 can access to the second storage unit 22.

The second storage unit 22 may be provided inside the storage controller 10. An access speed from the storage controller 10 to the second storage unit 22 is faster than an access speed from the storage controller 10 to the first storage unit 21. For example, when the first storage unit 21 is a storage unit using a portable recording medium such as a magnetic tape or an optical disk, as a recording medium, the second storage unit 22 may be implemented as a fixed type nonvolatile recording medium such as HDD or solid state drive (SSD), or a volatile semiconductor memory such as dynamic random access memory (DRAM) or static RAM (SRAM).

The storage controller 10 writes n sets of data (n is an integer of 3 or more) into the first storage unit 21. For example, the storage controller 10 writes data sets A, B and C depicted in FIG. 1 into the first storage unit 21. The storage controller 10 reads the written n sets of data from the first storage unit 21 at a predetermined timing.

Here, each of n sets of data may be, for example, one file, or a group of data including multiple files like logical volumes. Alternatively, each of the n sets of data may be preset by the user so as to be managed as one group.

The storage controller 10 includes a parity calculation unit 11 and a controller unit 12. Processing by the parity calculation unit 11 and the controller unit 12 is implemented, for example, when a processor included in the storage controller 10 performs a predetermined program.

When writing the n sets of data into the first storage unit 21, the parity calculation unit 11 adds dummy data to sets of data other than a first set of data that has the largest size among the n sets of data such that the sizes of the other sets of data become equal to the size of the first set of data. Then, the parity calculation unit 11 calculates (n−1) parities based on the first set of data and the other sets of data to which dummy data is added, and stores (n−1) parities in the second storage unit 22.

For example, it is assumed that data A, B and C depicted in FIG. 1 are each divided into blocks of the same size. Data A includes blocks A1 to A5, data B includes blocks B1 to B4, and data C includes blocks C1 to C3. Among data A, B, and C, data having the largest size is data A, which is equivalent to the first set of data described above. Therefore, the parity calculation unit 11 adds dummy data to data B and C. Assuming that dummy data is also divided to dummy blocks in the same size as the block, dummy block B5d is added to data B, and dummy blocks C4d and C5d are added to data C. For example, a predetermined equal value is preset to each of the dummy blocks.

The parity calculation unit 11 calculates (n−1) parities based on data A, and data B and C to each of which the parity is added. Since n=3 in the example of FIG. 1, the parity calculation unit 11 calculates two parities X and Y and stores them in the second storage unit 22.

The parity X is calculated, for example, as below. A partial parity X1 contained in the parity X is calculated by using blocks A1, B1, and C1. Similarly, a partial parity X2 contained in the parity X is calculated by using blocks A2, B2, and C2, and a partial parity X3 contained in the parity X is calculated by using blocks A3, B3, and C3. A partial parity X4 contained in the parity X is calculated by using blocks A4 and B4, and a dummy block C4d. A partial parity X5 contained in the parity X is calculated by using a block A5, and dummy blocks B5d and C5d.

Partial parities Y1 to Y5 contained in a parity Y are calculated by a similar procedure as the partial parities X1 to X5. However, a calculation formula for calculating the partial parities Y1 to Y5 is different from a calculation formula for calculating the partial parities X1 to X5.

Dummy data, which is data temporarily added for the parity calculation, may not be written into the first storage unit 21.

Parities X and Y may be calculated at a timing prior to a request of reading data A to C from the first storage unit 21. When calculating parities X and Y, it is desirable that data A to C is referred to by reading from a buffer in the storage controller 10 or a storage unit such as the second storage unit 22 which is accessible faster than the first storage unit 21, but not by reading from the first storage unit 21.

When reading n sets of data from the first storage unit 21, the controller unit 12 concurrently performs a read processing of reading a second set of data that has the smallest size among the n sets of data from the first storage unit 21, and a restoration processing of restoring two or more sets of data out of the n sets of data other than the second set of data by using calculated (n−1) parities and dummy data.

Among data A to C illustrated in FIG. 1, the data of the largest size is data C, which is equivalent to the second set of data described above. Therefore, the controller unit 12 reads data C from the first storage unit 21. The controller unit 12 restores data A and B by using parities X and Y stored in the second storage unit 22, and dummy data. The controller unit 12 concurrently performs the read processing of data C and the restoration processing of data A and B.

Blocks restored by using parities X and Y and dummy data are blocks A4, A5, and B4. The block A4 is restored by using partial parities X4 and Y4, and dummy data for the dummy block C4d. The block A5 is restored by using partial parities X5 and Y5, and dummy data for the dummy block C5d. The block B4 is restored by using partial parities X4 and Y4, and dummy data for the dummy block C4d.

A processing speed of restoring blocks A4, A5 and B4 is faster than a processing speed of reading blocks A4, A5 and B4 from the first storage unit 21. Consequently, time for the storage controller 10 to acquire blocks A4, A5 and B4 can be reduced by restoring blocks A4, A5 and B4 instead of reading the blocks from the first storage unit 21.

After having restored blocks A4, A5 and B4, the controller unit 12 may further concurrently perform a restoration processing of remaining blocks of data A and B and a read processing of data C, by using parities X and Y, and blocks already read from the first storage unit 21 out of data C. Thus, the storage controller 10 can acquire entire data A and B by restoration but without reading data from the first storage unit 21, and thereby the time desired for acquiring entire data A and B can be reduced. Further, since the restoration processing is performed concurrently with the reading of data C, time for the storage controller 10 to acquire entire data A to C is reduced compared with reading of all of data A to C from the first storage unit 21.

Here, the processing of restoring blocks A4, A5 and B4 by using parities X and Y and dummy data can be started at a timing earlier than the processing of restoring blocks A1 to A3 and B1 to B3 by using parities X and Y and already read blocks out of data C. This is because it is not desired to wait until a portion of data C is read from the first storage unit 21 to restore blocks A4, A5, and B4.

Thus, the timing of starting the restoration of data A and B can be advanced when the controller unit 12 restores blocks A4, A5, and B4 by using parities X and Y, and dummy data. Earlier the timing of starting the restoration, longer the duration in which the read processing of data C and the restoration processing of data A and B are performed concurrently, and thereby the processing efficiency can be improved.

Since remaining blocks of data A and B are restored by using parities X and Y, and already read blocks out of data C after blocks A4, A5, and B4 have been restored as described above, time for the storage controller 10 to acquire entire data A to C can be reduced.

The storage controller 10 may write m data (m is an integer more than n) including the above n sets of data into the first storage unit 21 and then read from the first storage unit 21. In this case, (n−1) parities may be calculated by using not only n sets of data but also m sets of data.

Second Embodiment

Figure 2:
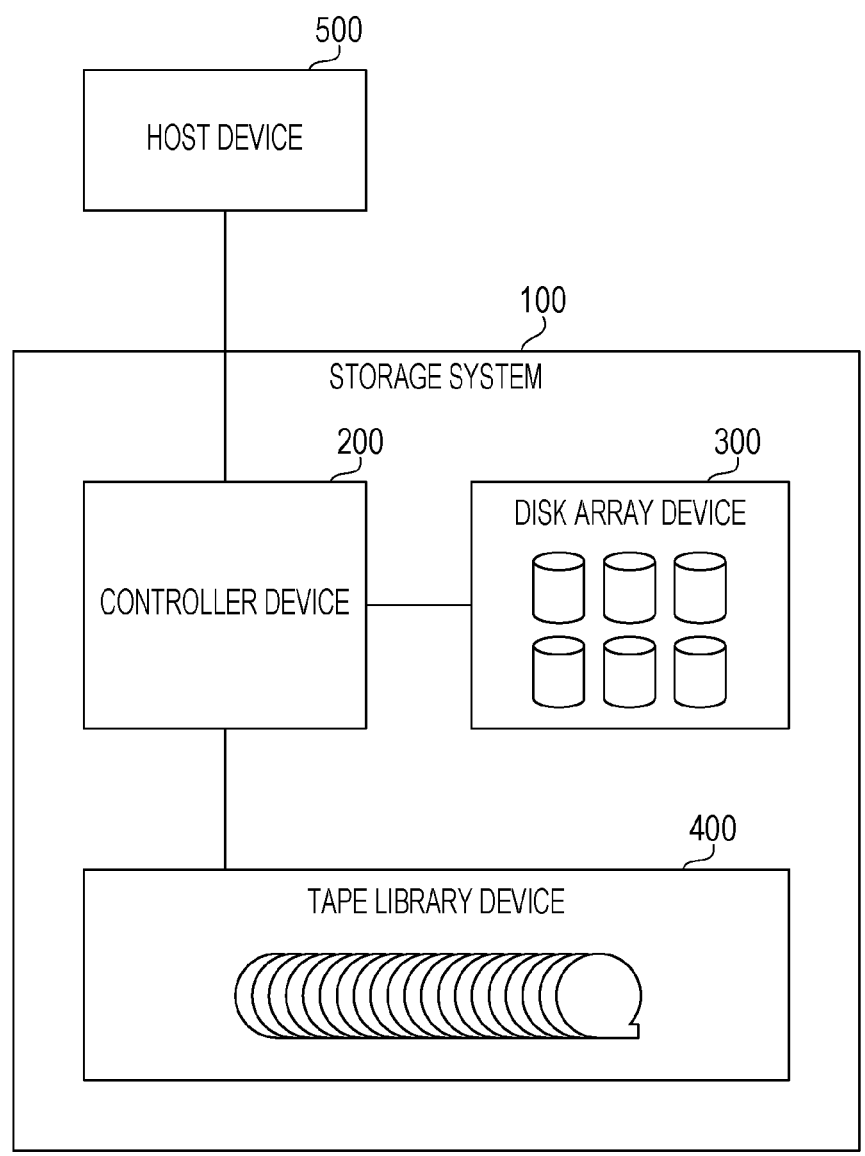
FIG. 2 illustrates a storage system according to a second embodiment.

FIG. 2 illustrates a configuration example of a storage system 100 according to a second embodiment. The storage system 100 includes a controller device 200 corresponding to the storage controller 10 in the first embodiment, a disk array device 300, and a tape library device 400. A host device 500 is connected to the controller device 200.

The controller device 200 is configured to control data transfer between the host device 500 and the disk array device 300, and data transfer between the disk array device 300 and the tape library device 400. The controller device 200 is configured to control the storage system 100 so as to operate as a hierarchical type virtual tape library system with the tape library device 400 as a library device, and the disk array device 300 as a cache device. Here, the virtual tape library system is a system configured in such a manner that the host device 500 can virtually access a high-capacity storage region implemented by the tape library device 400, through the disk array device 300.

The disk array device 300 includes a plurality of HDDs as recording media implementing a storage region of a cache device in the virtual tape library system. The disk array device 300 may include a nonvolatile storage unit of the other type such as SSD, as a recording medium for implementing a storage region of the cache device.

The tape library device 400 is a storage unit using a plurality of magnetic tapes as a recording medium for implementing a back-end storage region in the virtual tape library system. As described later, the tape library device 400 includes one or more tape drives for performing data access to the magnetic tape, and a mechanism for conveying a tape cartridge housing the magnetic tape.

As a recording medium for implementing a back-end storage region of the virtual tape library system, a magnetic tape as well as a portable recording medium such as, for example, an optical disk and an optical magnetic disk may be used.

The controller device 200, the disk array device 300, and the tape library device 400 are provided, for example, in one housing or individually in separate housings. Alternatively, for example, the controller device 200 and the disk array device 300 may be provided in one housing, and the tape library device 400 may be provided in a separate housing.

The host device 500 accesses to a logical volume defined in a virtual tape library system in response to an access request to the controller device 200 by user's input operation. The logical volume is a logical storage region provided to the user by using a physical storage region of the storage system 100.

Figure 3:
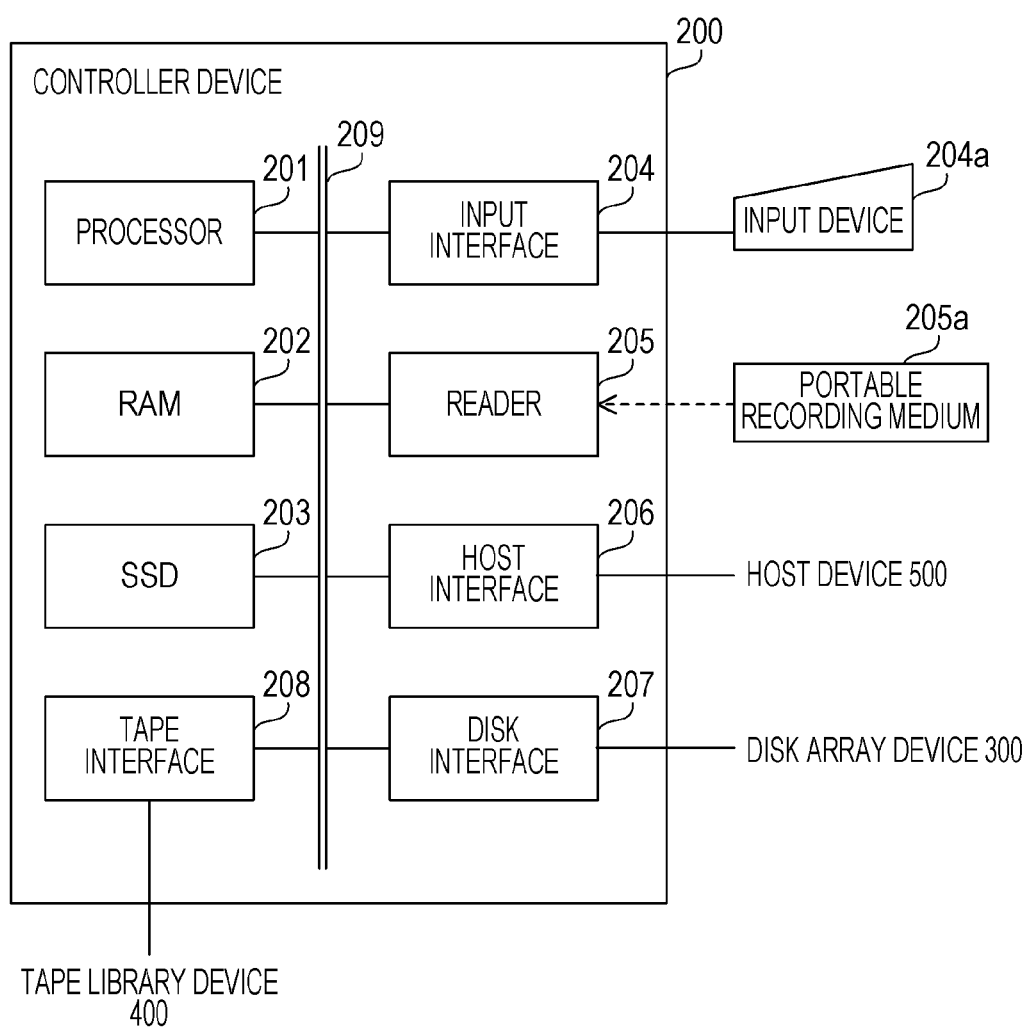
FIG. 3 illustrates a hardware example of a controller device.

FIG. 3 illustrates a hardware example of the controller device 200. The controller device 200 is implemented, for example, as a computer such as illustrated in FIG. 3.

The controller device 200 as a whole is controlled by a processor 201. The processor 201 may be a multiprocessor. The processor 201 is, for example, a central processing unit (CPU), a micro processing unit (MPU), a digital signal processor (DSP), an application specific integrated circuit (ASIC), or a programmable logic device (PLD). Further, the processor 201 may be a combination of two or more elements selected from the group consisting of the CPU, the MPU, the DSP, the ASIC and the PLD.

A RAM 202 and a plurality of peripheral equipment are connected to the processor 201 via a bus 209.

The RAM 202 is used as a main storage unit of the controller device 200. The RAM 202 temporarily stores at least a portion of a firmware program executed by the processor 201. Further, the RAM 202 stores various data desired for processing by the processor 201.

Peripheral equipment connected to the bus 209 include a SSD 203, an input interface 204, a reader 205, a host interface 206, a disk interface 207, and a tape interface 208.

The SSD 203 is used as a secondary storage unit of the controller device 200. The SSD 203 stores a firmware program and various data. A nonvolatile storage unit of the other type such as HDD may be used as the secondary storage unit.

The input interface 204 is configured to be connectable to, for example, the input device 204a including various operation keys and the like. The input interface 204 is configured to transmit a signal received from the input device 204a to the processor 201 via the bus 209. The input device 204a may be mounted on the controller device 200.

The reader 205 receives a portable recording medium 205a, which is detachable therefrom. The reader 205 reads data recorded in the portable recording medium 205a and transmits the data to the processor 201. An optical disk, an optical magnetic disk, a semiconductor memory and the like are available as the portable recording medium 205a.

The host interface 206 is a communication interface configured to transmit to and receive data from the host device 500. The disk interface 207 is a communication interface configured to transmit to and receive data from the disk array device 300. The tape interface 208 is a communication interface configured to transmit and receive data from the tape library device 400.

Similarly to the controller device 200, the host device 500 may be implemented as a computer including a processor, a RAM, peripheral equipment, and the like.

Figure 4:
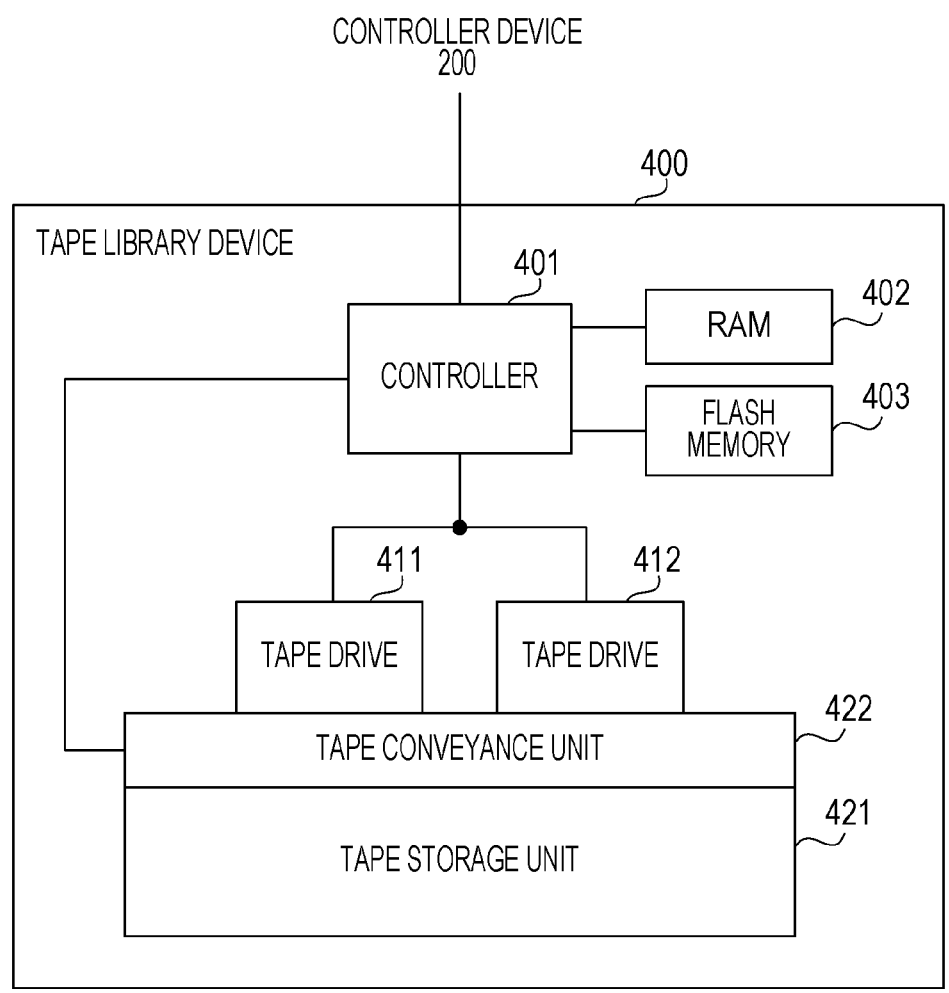
FIG. 4 illustrates a hardware example of a tape library device.

FIG. 4 illustrates a hardware example of the tape library device 400. The tape library device 400 includes a controller 401, a RAM 402, a flash memory 403, a tape drive 411, 412, a tape storage unit 421, and a tape conveyance unit 422.

The controller 401 includes, for example, a CPU configured to generally control the tape library device 400 as a whole. The RAM 402 temporarily stores at least a portion of a firmware program to be executed by the controller 401. Further, the RAM 402 stores various data desired for processing by the controller 401. The flash memory 403 stores a firmware program and various data.

Each of the tape drives 411, 412 is configured to receive one tape cartridge conveyed by the tape conveyance unit 422, and, under control of the controller 401, write data into a magnetic tape in the tape cartridge and read data from the magnetic tape. The number of tape drives included in the tape library device 400 is not limited specifically.

The tape storage unit 421 stores multiple tape cartridges. The tape conveyance unit 422 is configured to convey tape cartridges under control of the controller 401. The tape conveyance unit 422 is configured to convey, for example, a tape cartridge stored in the tape storage unit 421 to either of the tape drives 411, 412 and mount thereon. Further, the tape conveyance unit 422 is configured to remove a tape cartridge from either of the tape drives 411 or 412, and convey the tape cartridge to the tape storage unit 421 and store therein.

Figure 5:
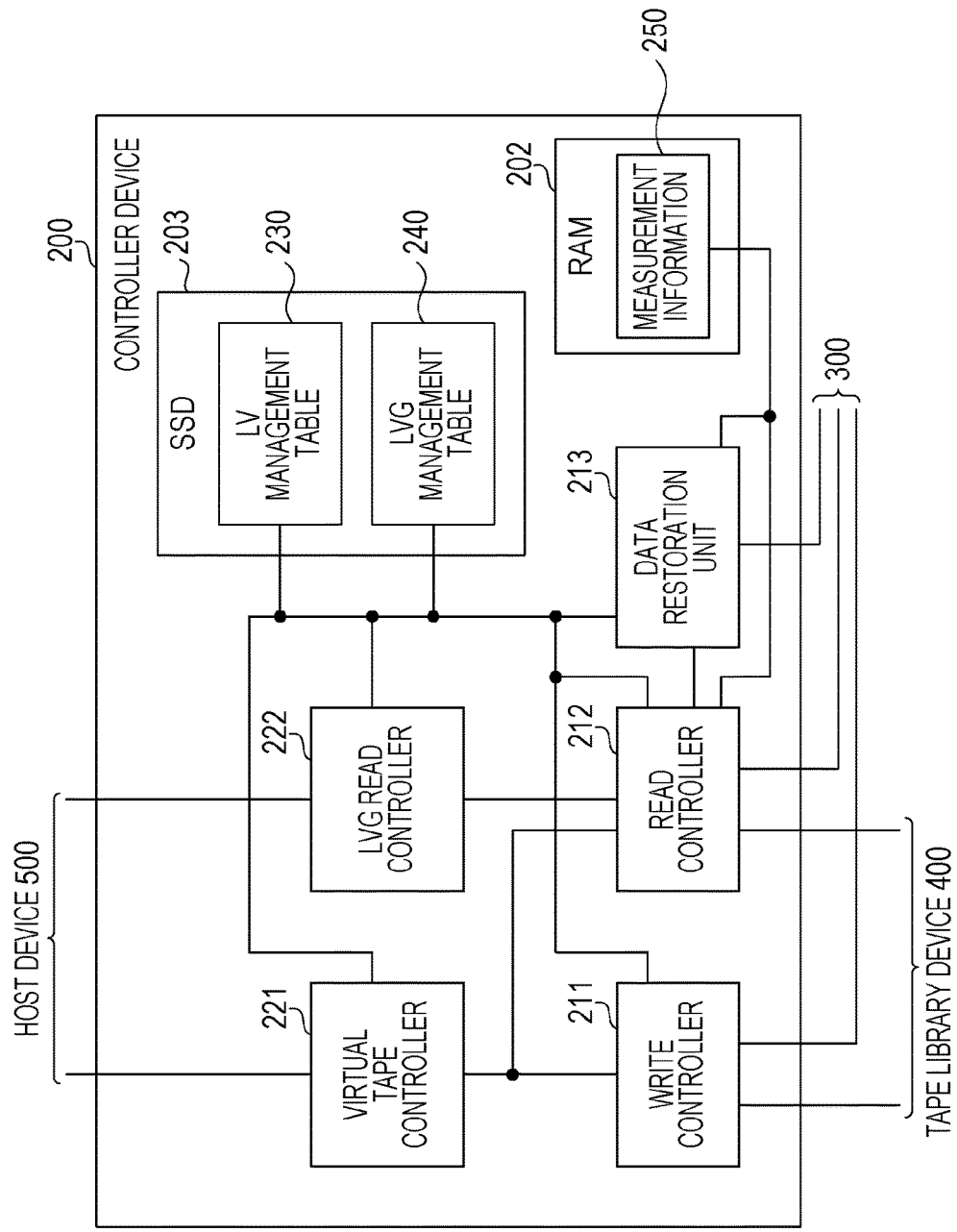
FIG. 5 illustrates a functional example of the controller device.

FIG. 5 is a block diagram illustrating a functional example of the controller device 200. A controller device 200 includes a write controller 211, a read controller 212, a data restoration unit 213, a virtual tape controller 221, and a logical volume group (LVG) read controller 222. Processing by those components is implemented, for example, when a processor 201 of the controller device 200 executes a predetermined firmware program.

Further, a SSD 203 of the controller device 200 stores a logical volume (LV) management table 230 and a LVG management table 240. At least either of the LV management table 230 or the LVG management table 240 may be stored, for example, in any one of HDDs within the disk array device 300. Further, a RAM 202 of the controller device 200 temporarily stores measurement information 250.

The write controller 211 is configured to, in accordance with a command of the virtual tape controller 221, transfer data in the disk array device 300 to the tape library device 400 and request the tape library device 400 to write the transferred data into a magnetic tape. Further, in accordance with a command of the virtual tape controller 221, the write controller 211 may write data received from the host device 500 into the disk array device 300.

Here, data transfer to the tape library device 400 in accordance with the command of the virtual tape controller 221 is performed based on a logical volume group (LVG) including one or more predetermined logical volumes (LV). When transferring data of the logical volume group to the tape library device 400, the write controller 211 calculates the two types of parities by using data in logical volumes belonging to the logical volume group, and stores the calculated the two types of parities in the disk array device 300. Hereinafter, the calculated the two types of parities may be referred to as a "Parity P" and a "Parity Q" respectively.

In accordance with a command of the virtual tape controller 221 or the LVG read controller 222, the read controller 212 requests the tape library device 400 to read data from the magnetic tape. The read controller 212 stores data transmitted from the tape library device 400 in accordance with the read request in the disk array device 300. Further, in accordance with a command of the virtual tape controller 221, the read controller 212 reads data from the disk array device 300 and transfer the data to the virtual tape controller 221.

Here, when requested to read data from the tape library device 400 based on the logical volume group, the read controller 212 causes the data restoration unit 213 to restore some logical volumes out of logical volumes belonging to the logical volume group by using a parity, without reading from the tape library device 400. Time for reading data from the tape library device 400 is long, for example, compared with a time for reading data from the disk array device 300. As described above, since some logical volumes in the logical volume group is restored by the data restoration unit 213, amount of data actually read from the tape library device 400 decreases, and thereby a time for storing data of entire logical volume group in the disk array device 300 can be reduced.

The data restoration unit 213 restores some logical volumes in the logical volume group by using dummy data for logical volumes within the same logical volume group, and the parities P and Q stored in the disk array device 300. Further, the data restoration unit 213 restores data by using logical volumes already read from the tape library device 400, and parities P and Q.

In accordance with a request from the host device 500 for access to a virtual tape library system, the virtual tape controller 221 commands the write controller 211 or the read controller 212 to execute processing such as data access to a HDD within the disk array device 300, and data access to a magnetic tape within the tape library device 400. The virtual tape controller 221 performs, for example, such controls as described below.

The virtual tape controller 221 secures a region of logic volumes in the disk array device 300. Upon receiving a write request to a logical volume from the host device 500, the virtual tape controller 221 writes data requested to perform write into a relevant region on the disk array device 300. At an optional timing after writing data to the disk array device 300, the virtual tape controller 221 writes the logical volume into which data has been written, into a magnetic tape in the tape library device 400. Here, when writing a certain logical volume in the disk array device 300 into the tape library device 400, the virtual tape controller 221 controls in such a manner that all the logical volumes in a logical volume group to which the certain logical volume belongs are written into a magnetic tape in the tape library device 400.

Further, when unused capacity of the disk array device 300 becomes less than a predetermined capacity, the virtual tape controller 221 deletes, from the disk array device 300, a logical volume group having an oldest access time among logical volume groups in the disk array device 300. If any logical volume group to be deleted contains data not written into the magnetic tape in the tape library device 400, the virtual tape controller 221 controls in such a manner that the logical volume group to be deleted is written into the magnetic tape in the tape library device 400.

When writing a logical volume into a magnetic tape, the virtual tape controller 221 registers information indicating a write location thereof in the LV management table 230 in association with identification information of the logical volume.

On the other hand, upon receiving a data read request from the host device 500, the virtual tape controller 221 determines whether a logical volume containing data requested to read is cached in the disk array device 300. If the logical volume is cached in the disk array device 300, the virtual tape controller 221 reads, from the disk array device 300, the data requested to read, and transmits the data to the host device 500.

On the other hand, if the logical volume is not cached in the disk array device 300, the virtual tape controller 221 identifies a magnetic tape in which the logical volume is stored, by referring to the LV management table 230. The virtual tape controller 221 reads the logical volume from the identified magnetic tape and writes the logical volume into the disk array device 300. The processing of data transfer from the magnetic tape to the disk array device 300 is referred to as "recall". The virtual tape controller 221 reads data requested to read, from the logical volume written into the disk array device 300, and transmits the data to the host device 500.

In accordance with a request from a tape library device such as, for example, the host device 500, the LVG read controller 222 requests data reading from the tape library device 400 based on the logical volume group. Such a reading is requested, for example, when a logical volume group stored in the tape library device 400 is read to the disk array device 300 to move to another tape library device (such as, for example, a disk array device in the other storage system). Alternatively, the reading may be requested when LVGs distributed and stored in multiple magnetic tapes in the tape library device 400 are read once and are collectively copied to a magnetic tape for external storage which is different from a magnetic tape for a virtual tape library.

Next, information registered in the LV management table 230, the LVG management table 240, and the measurement information 250 is described.

Figure 6:
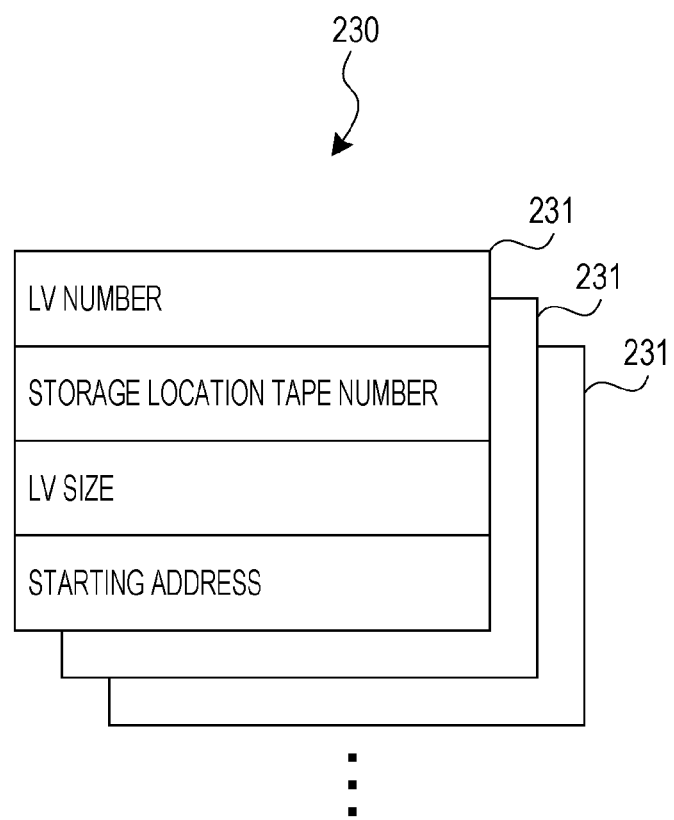
FIG. 6 illustrates an example of a LV management table.

FIG. 6 illustrates an example of the LV management table. The LV management table 230 maintains information indicating in which magnetic tape and at which location thereof a logical volume defined on a virtual tape library system is stored. The LV management table 230 contains a record 231 generated for each logical volume, the record 231 being provided with fields of "LV number", "storage location tape number", "LV size", and "starting address".

An identification number for identifying an associated logical volume is registered in the "LV number" field. An identification number for identifying a magnetic tape in which an associated logical volume is stored is registered in the "storage location tape number" field. The size of an associated logical volume is registered in the "LV size" field.

An address indicating a starting region in a magnetic tape in which an associated logical volume is stored is registered in the "starting address" field.

Figure 7:
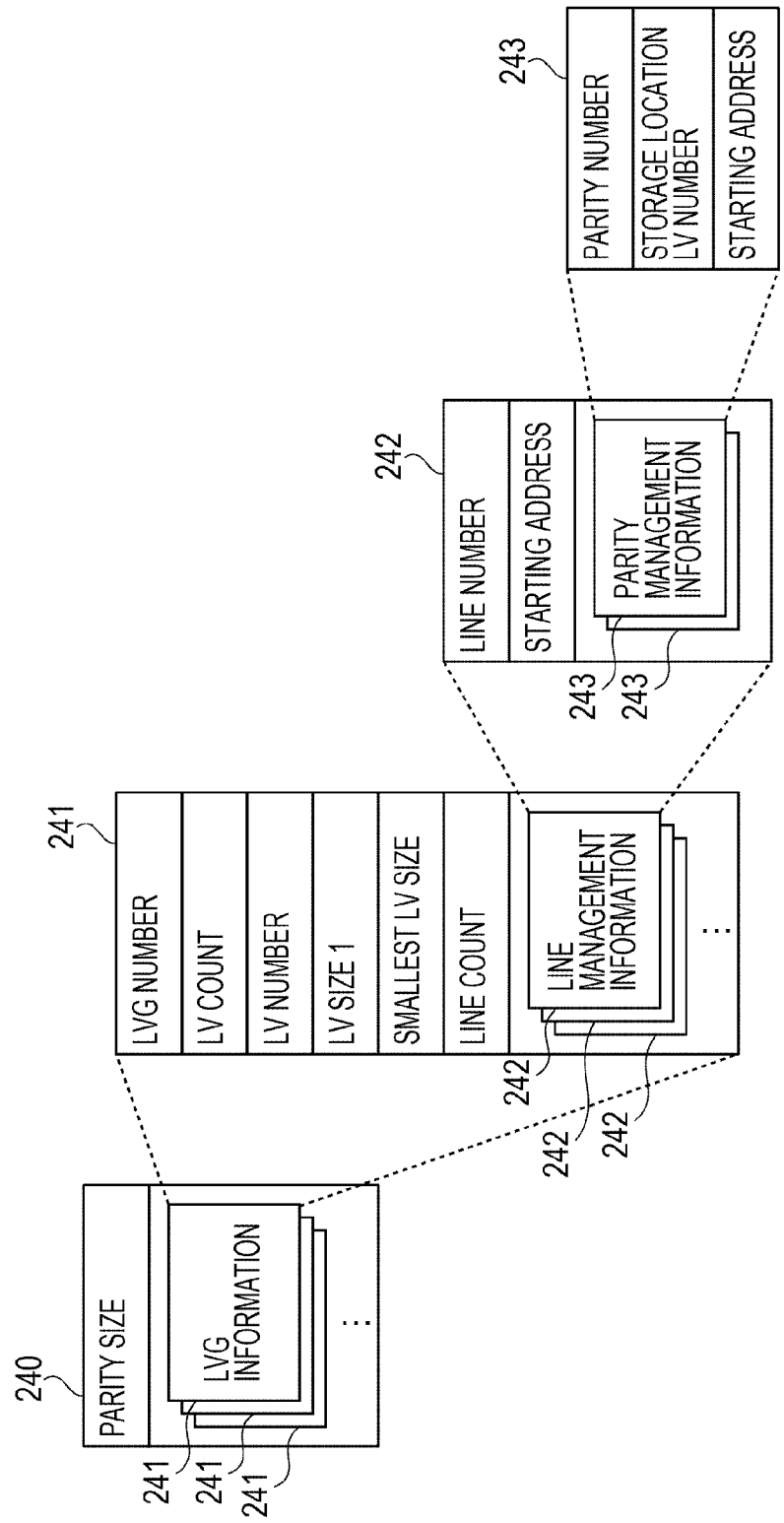
FIG. 7 illustrates an example (1) of the LV management table.

FIG. 7 illustrates an example (1) of the LVG management table. The LVG management table 240 maintains information for managing logical volumes belonging to a logical volume group, as well as information used when reading a logical volume group from the magnetic tape in the tape library device 400.

The LVG management table 240 is provided with the "parity size" field as information common to all of logical volume groups. Size of the parity calculated by the write controller 211 in one parity operation is registered in the "parity size" field. The parity size is equal to the size of one block acquired by dividing the logical volume in the parity operation. The block is described in detail later.

The LVG information 241 for each logical volume group is registered in the LVG management table 240. The LVG information 241 is provided with "LVG number", "LV count", "LV number", "LV size 1", "smallest LV size", and "line count" fields.

An identification number for identifying an associated logical volume group is registered in the "LVG number" field. A count of logical volumes belonging to an associated logical volume group is registered in the "LV count" field. A list of identification numbers for identifying logical volumes belonging to an associated logical volume group is registered in the "LV number" field. A logical volume and a logical volume group to which the logical volume belongs can be selected by the user through the host device 500, and information of user's corresponding selection is registered in "LV count" and "LV number" fields.

Size of the largest logical volume among logical volumes belong to an associated logical volume group is registered in the "LV size 1" field. Size of the smallest logical volume among logical volumes belong to an associated logical volume group is registered in the "smallest LV size" field.

The number of blocks acquired from the largest logical volume among the logical volumes belonging to an associated logical volume group is registered in the "line count" field. Information in the "line count" field can be acquired by dividing a size registered in the "LV size 1" field by a size registered in the "parity size" field.

Information in "LV size 1", "smallest LV size", and "line count" fields is, for example, automatically registered by the virtual tape controller 221 when logical volumes made belong to a logical volume group are selected by the user.

Further, line management information 242 for each line is registered in LVG information 241. A count of the line management information 242 registered in the LVG information 241 matches a count registered in the "line count" field. The line management information 242 is provided with "line number" and "starting address" fields.

An identification number for identifying an associated line is registered in the "line number" field. The identification number is allocated in order from a head of the line. Information indicating a position from the head of an associated line is registered in the "starting address" field. Address of the starting line is "0", and address of a next line is a value acquired by adding an address corresponding to a size registered in the "parity size" field to an address of a preceding line.

Two pieces of parity management information 243 for the parities P and Q are registered in the line management information 242.

The parity management information 243 indicates a storage region in the disk array device 300 which stores a parity to be used for a logical volume group identified with the "LVG number" and a line identified with the "line number". That is, the parity managed by the parity management information 243 is data acquired by dividing a lump of parities calculated from one logical volume group on the line basis.

The line management information 243 is provided with "parity number", "storage location LV number", and "starting address" fields. An identification number for identifying an associated parity is registered in the "parity number" field. Consecutive identification numbers are given to parities of a same logical volume group, for example, in line order. An identification number of a logical volume on the disk array device 300 in which an associated parity is stored is registered in the "storage location LV number" field. The logical volume indicated by the "storage location LV number" is one of logical volumes not belonging to the logical volume group. Information indicating the position of a starting storage region of an associated parity in a logical volume indicated by the "storage location LV number" is registered in the "starting address" field.

Figure 8:
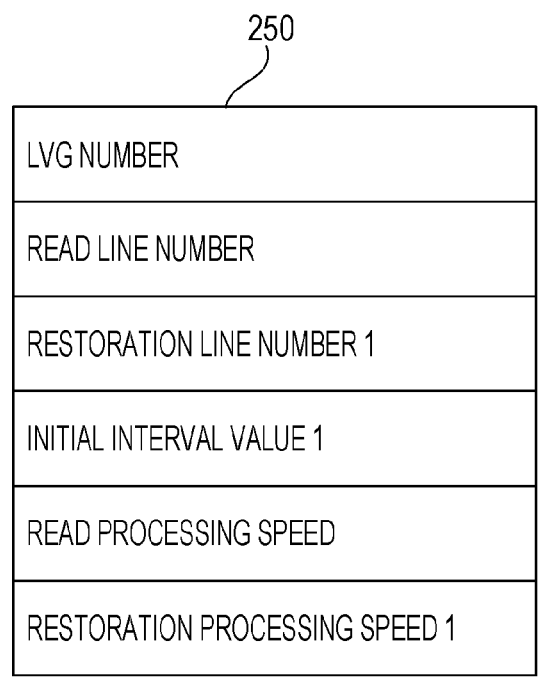
FIG. 8 illustrates an example (1) of measurement information.

FIG. 8 illustrates an example (1) of measurement information. The measurement information 250 is information registered or referred to by the read controller 212 and the data restoration unit 213 when sets of data is read based on the logical volume group from a magnetic tape in the tape library device 400 to the disk array device 300. The measurement information 250 is provided with "LVG number", "read line number", "restoration line number 1", "initial interval value 1", "read processing speed", and "restoration processing speed 1" fields.

An identification number for identifying a logical volume group of the read target is registered in the "LVG number" field. Before starting to read a logical volume group from a magnetic tape in the tape library device 400, the read controller 212 generates, in a RAM 202, measurement information 250 holding the identification number of the logical volume group registered in the "LVG number" field thereof. Thereafter, information of fields in the generated measurement information 250 other than the "LVG number" field is updated by the read controller 212 or the data restoration unit 213 as occasion calls until the entire logical volume group is written into the disk array device 300.

A line number indicating a line in a logical volume from which data is being read from a magnetic tape in the tape library device 400 is registered in the "read line number" field.

A line number indicating a line in a logical volume from which data is being restored by using the parity is registered in the "restoration line number 1" field.

Amount of data used to determine a timing to start or resume restoration processing by using the parity is registered in the "initial interval value 1" field. When restoring a logical volume, the data restoration unit 213 makes a difference between a remaining data amount in the logical volume to be restored and a remaining data amount to be read from a logical volume already read from the tape library device 400 equal to or larger than the amount of data registered in the "initial interval value 1" field. Information of the "initial interval value 1" field is calculated by the data restoration unit 213.

A measured speed of reading the logical volume from the magnetic tape by the read controller 212 is registered in the "read processing speed" field. A measured speed of restoring the logical volume by the data restoration unit 213 with the parities P and Q is registered in the "restoration processing speed 1" field.

Figure 9:
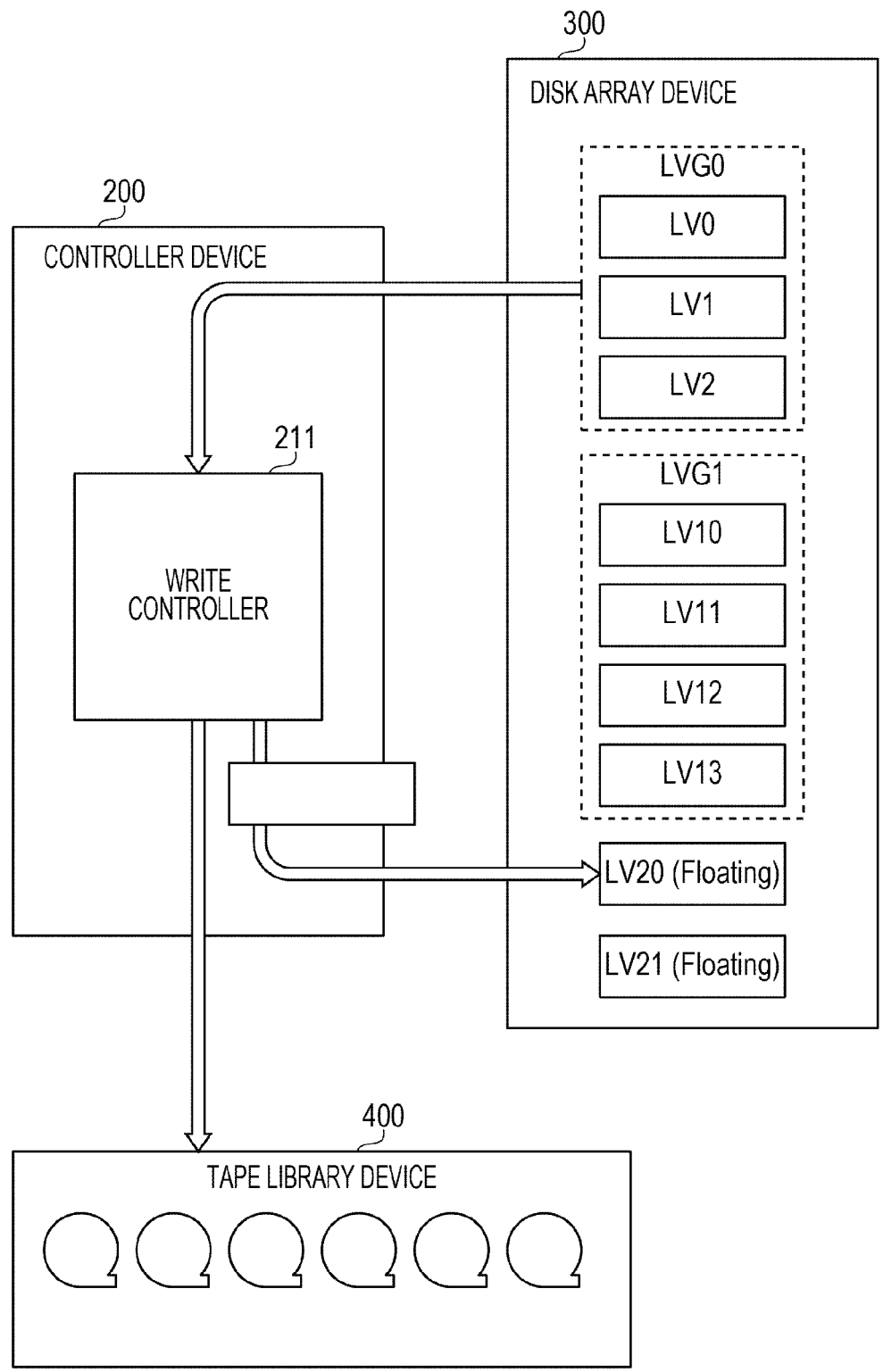
FIG. 9 illustrates an overview of a write processing example of a logical volume group.

Next, FIG. 9 illustrates an overview of a write processing example of a logical volume group.

In accordance with a command of the user through the host device 500, the controller device 200 can allocate any plurality of logical volumes on a virtual tape library system to a logical volume group. The logical volume allocated to the logical volume group becomes recognized by the host device 500, for example, as a logical storage area accessible by the user. On the other hand, the controller device 200 manages a logical volume not allocated to the logical volume group and not recognized by the host device 500, as a region called floating.

In the example of FIG. 9, logical volumes LV0 to LV2 are allocated to the logical volume group LVG0, and logical volumes LV10 to LV13 are allocated to the logical volume group LVG1. On the other hand, logical volumes LV20, LV21 belong to the floating region.

As described above, the write controller 211 of the controller device 200 executes data transfer to the tape library device 400 based on the logical volume group in accordance with the command of the virtual tape controller 221. When writing the logical volume group into a magnetic tape in the tape library device 400, the write controller 211 calculates the parity by using data in logical volumes belonging to the logical volume group, and stores the calculated parity into a predetermined storage region in the disk array device 300. The write controller 211 stores, for example, the calculated parity in a logical volume belonging to the floating region.

In the example of FIG. 9, when writing data of the logical volume group LVG0 into the tape library device 400, the write controller 211 calculates the parity based on data of logical volumes LV0 to LV2 belonging to the logical volume group LVG0. The write controller 211 stores the calculated parity in the logical volume LV20 belonging to the floating region. Thereafter, the parity stored in the logical volume LV20 is referred to by the data restoration unit 213 when the logical volume group LVG0 is read from a magnetic tape of the tape library device 400 to the disk array device 300.

Next, a procedure for writing into a magnetic tape in the tape library device based on the logical volume group is described.

Figure 10:
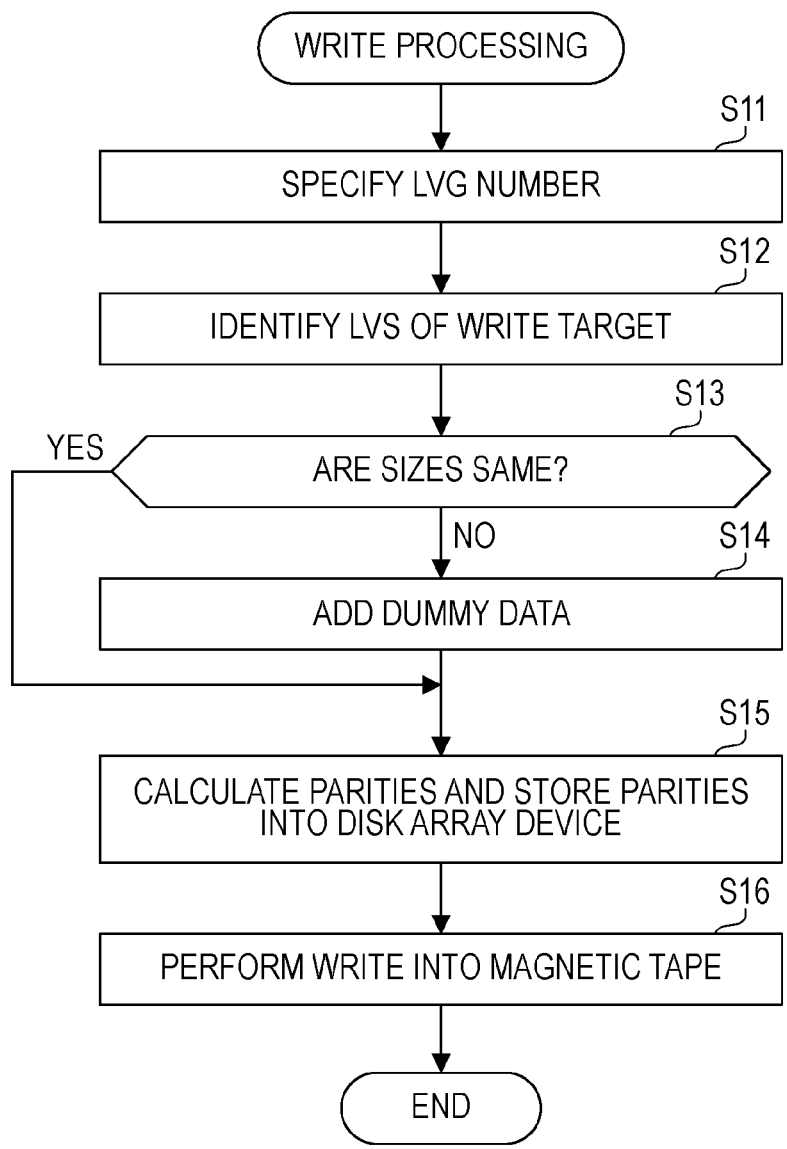
FIG. 10 is a flowchart illustrating a write processing example.

FIG. 10 is a flowchart illustrating a write processing example.

Hereinafter, the processing illustrated in FIG. 10 is described in the order of step number.

[Step S11] The virtual tape controller 221 requests the write controller 21 to perform write to a magnetic tape by specifying a LVG number identifying the logical volume group.

[Step S12] The write controller 211 identifies logical volumes belonging to the logical volume group specified by the virtual tape controller 221, by referring to the LVG management table 240.

[Step S13] The write controller 211 reads the sizes of the logical volumes identified at the step S12 from the LV management table 240, and determines whether the sizes of the logical volumes are same. If the sizes of the logical volumes are same, the write controller 211 executes processing of the step S15. On the other hand, when the size of at least one logical volume among the logical volumes is different from the sizes of the other logical volumes, the write controller 211 executes processing of the step S14.

[Step S14] The write controller 211 adds dummy data to the logical volumes other than the largest logical volume among the identified logical volumes. Thus, the write controller 211 equalizes the sizes of the logical volumes.

[Step S15] The write controller 211 reads blocks of each of the logical volumes from the disk array device 300 in the line number order and calculates parities P and Q. The write controller 211 stores the calculated the parities P and Q into predetermined logical volumes belonging to a floating region in the disk array device 300.

Every time the write controller 211 calculates a block with one line number in a parity, the write controller 211 registers line management information 242 for the line number into the LVG management table 240. At the step S15, two pieces of the parity management information 243 are registered in the line management information 242.

[Step S16] The write controller 211 transfers data of logical volumes identified at the step S12 from the disk array device 300 to the tape library device 400, and commands the tape library device 400 to store the transferred data into a magnetic tape. The tape library device 400 selects, for example, unused magnetic tapes from the tape storage unit 421 sequentially, mounts selected magnetic tapes on either of tape drives 411 and 412, and writes data received from the write controller 211 into mounted magnetic tapes. The write controller 211 receives, from the tape library device 400, the identification number and the write position information of the magnetic tape in which logical volumes are written, and registers such information to a record of an associated logical volume in the LV management table 230.

At the step S16, dummy data added to the logical volume may not be written into the magnetic tape.

Figure 11:
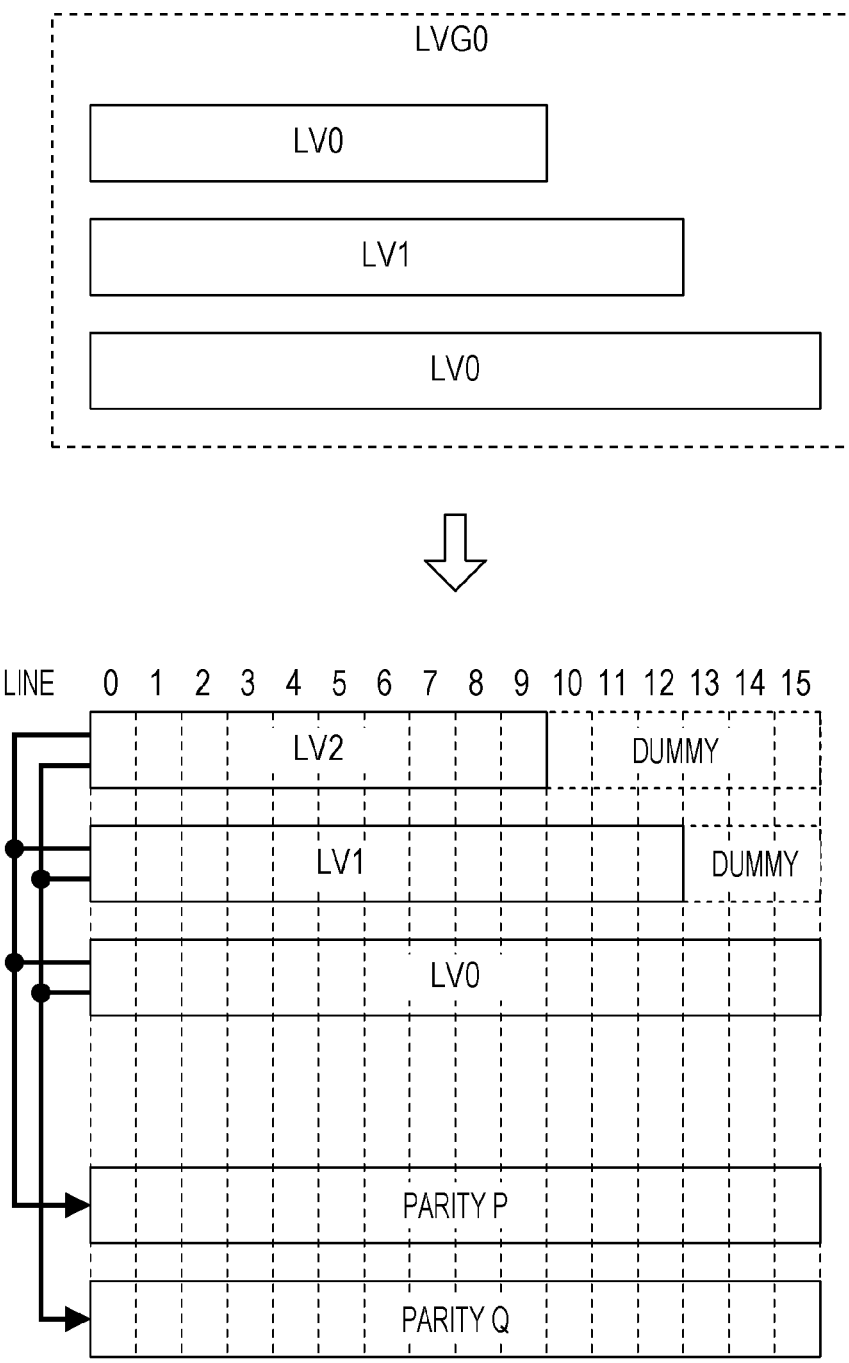
FIG. 11 illustrates a specific example of parity calculation processing.

FIG. 11 illustrates a specific example of the parity calculation processing. Hereinafter, an example is described on assumption that logical volumes LV0 to LV2 belong to one logical volume group LVG0.

Multiple logical volumes belonging to a logical volume group may not have a same size. Thus, when calculating the parities P and Q, the write controller 211 adds dummy data to the tail ends of the logical volumes belonging to the logical volume group to equalize the sizes of the logical volumes.

Dummy data has a predetermined uniform value such as "0". Dummy data is added to the logical volumes other than the largest logical volume among the logical volumes belonging to a logical volume group. In the example of FIG. 11, the size of the logical volume LV0 is largest among logical volumes LV0 to LV2 belonging to the same logical volume group. For example, the write controller 211 equalizes the sizes of the logical volumes LV0 to LV2 by adding dummy data to both the logical volumes LV1 and LV2 as illustrated on the lower side of FIG. 11.

Hereinafter, to simplify the description, a logical volume having dummy data added to the tail end thereof, if any, will be referred to, in its entirety, as "logical volume". However, dummy data may not be written into a magnetic tape of the tape library device 400 since it is data temporarily added for the purpose of parity calculation.

After executing the size equalization processing, the write controller 211 calculates two types of parities P and Q for each of blocks of logical volumes LV0 to LV2, the blocks being formed by dividing each of the logical volumes by a fixed size from the head thereof. The write controller 211 calculates the parities P and Q for each block by using blocks with the same line number in logical volumes belonging to the logical volume group.

For example, blocks of the line number 0 in the parities P and Q are calculated based on the blocks of the line number 0 in the logical volumes LV0 to LV2. Similarly, blocks of the line number 1 in the parities P and Q are calculated based on the blocks of the line number 1 in the logical volumes LV0 to LV2.

Blocks of the line number 10 in the parities P and Q are calculated based on the blocks of the line number 10 in the logical volumes LV0 to LV2. Here, dummy data is used as the block of the line number 10 in the logical volume LV2. In this way, even when the sizes of logical volumes belonging to a logical volume group are not the same, the write controller 211 can calculate the parities P and Q based on the data of those logical volumes by adding dummy data to the tail end thereof.

Then, the write controller 211 stores the calculated the parities P and Q in predetermined logical volumes belonging to a floating region in the disk array device 300.

In the parity calculation processing, a storage region for entire dummy data to be added may not be secured in a storage region of the disk array device 300. For example, the write controller 211 stores dummy data for one block in a storage region of the disk array device 300. Then, when dummy data is to be used to calculate blocks of parities for a certain line number, the write controller 211 reads stored dummy data for one block from the disk array device 300.

Next, processing in which the controller device 200 reads data from a magnetic tape of the tape library device 400 based on the logical volume group and stores the data in the disk array device 300 is described.

Through the above processing by the write controller 211, the parities P and Q for a logical volume group stored in a magnetic tape of the tape library device 400 are stored in the disk array device 300. When the two types of parities P, Q are stored as in this embodiment, the controller device 200 can restore at most two logical volumes among the logical volumes belonging to a logical volume group, from a rest of the logical volumes and the parities P and Q. Further, by using the dummy data without using the data of the logical volumes read from the magnetic tape, the controller device 200 also may restore a portion of at most two logical volumes which can be restored, by devising the read order of the logical volumes.

Then, upon receiving a command from the LVG read controller 222 to read data from the logical volume group, the read controller 212 reads logical volumes belonging to the directed logical volume group except the two logical volumes, from the magnetic tape of the tape library device 400. Without reading the remaining two logical volumes, the read controller 212 causes the data restoration unit 213 to restore the two logical volumes by using dummy data, data of already read logical volumes, and the parities P and Q stored in the disk array device 300. Thus, time for storing data of entire logical volume group in the disk array device 300 is reduced.

Further, the logical volume restoration processing by the data restoration unit 213 is performed concurrently with the read processing of the other one logical volume from the magnetic tape by the read controller 212. Thus, time for storing data of entire logical volume group in the disk array device 300 is further reduced.

Especially, in this embodiment, processing of restoring the remaining two logical volumes from the middle to the tail end thereof by using the dummy data for the logical volumes read from the magnetic tape is performed ahead of processing of restoring the remaining two logical volumes from a head thereof by using data of logical volumes read from the magnetic tape. By performing the former processing ahead of the latter processing, concurrence between sets of data readout from the magnetic tape and restoration can be improved (or, parallel execution time can be lengthened), and thereby time for storing data of entire logical volume group in the disk array device 300 can be reduced.

Next, an example of processing procedures of the read controller 212 and the data restoration unit 213 is described with reference to the flowchart.

Figure 12:
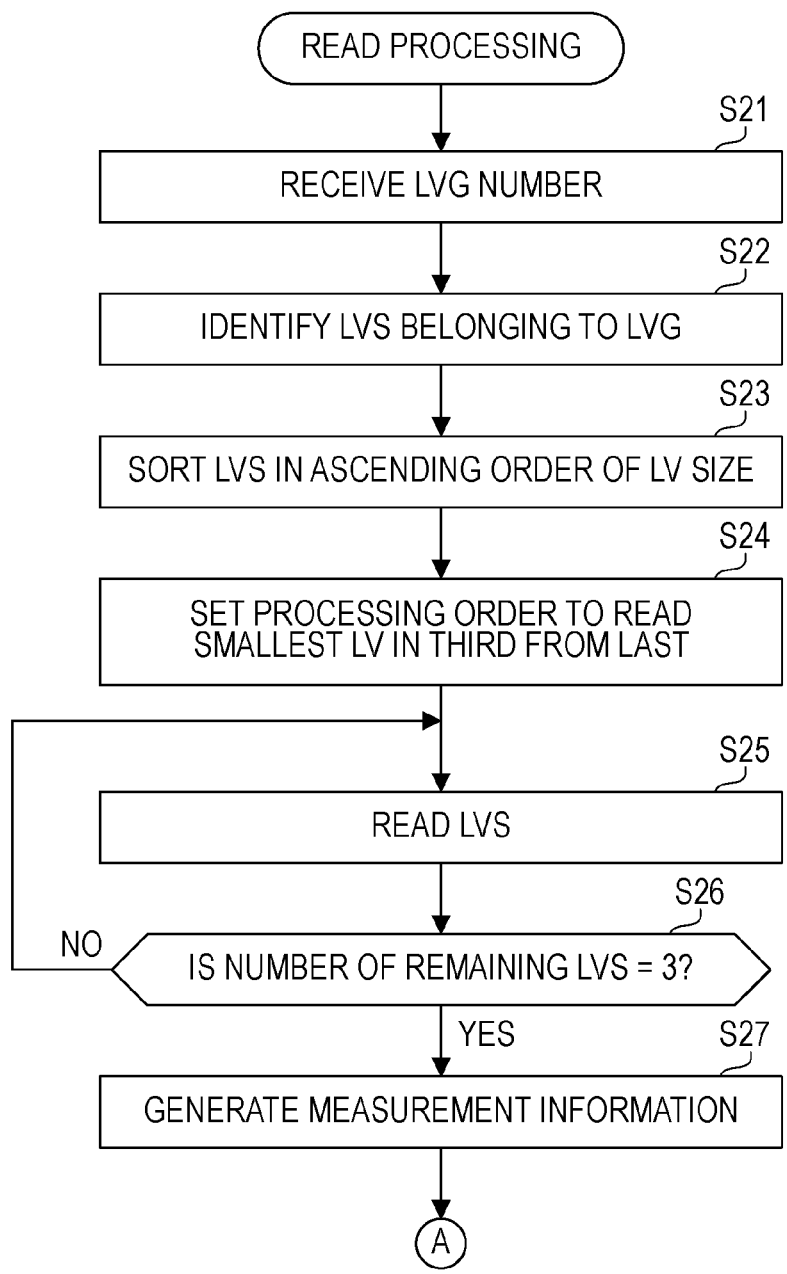
FIG. 12 is a flowchart illustrating a processing procedure (1) of a read controller.

FIG. 12 is a flowchart illustrating a processing procedure (1) of a read controller. Hereinafter, the processing illustrated in FIG. 12 is described in the order of step number.

[Step S21] The read controller 212 receives the read processing execution command and designation of the LVG number from the LVG read controller 222.

[Step S22] The read controller 212 identifies logical volumes belonging to the logical volume group indicated by the designated LVG number, by referring to the LVG management table 240.

[Step S23] The read controller 212 reads the sizes of the identified logical volumes from the LV management table 230 and sorts the identified logical volumes in the ascending order of the logical volume size.

[Step S24] The read controller 212 sets the processing order such that the smallest logical volume is read in the third from the last. Read processing is performed in the ascending order from the second smallest logical volume, with the last three logical volumes read in the order of the smallest logical volume, the second largest logical volume, and the largest logical volume.

For example, for reading the logical volumes belonging to the logical volume group LVG0 illustrated in FIG. 11 from a magnetic tape and storing the read logical volumes in the disk array device 300, the reading order is set as follows: Among the logical volumes belonging to the logical volume group LVG0, the smallest logical volume is the logical volume LV2, the largest logical volume is the logical volume LV0, and the second largest logical volume is the logical volume LV1. In this case, reading is performed in the order of logical volumes LV2, LV1, and LV0.

As described later, the largest logical volume and the second largest volume are not actually read from the tape library device 400, but are restored by using parities P and Q. Therefore, at this step, only the read order is determined. That is, the logical volumes other than the largest and the second largest logical volumes are targets to be read from the tape library device 400 at the step 25 and subsequent steps.

[Step S25] The read controller 212 selects blocks yet to be read among blocks of logical volumes of the read target, and reads data of the selected blocks from a magnetic tape in the tape library device 400. Blocks are selected in the order set at the step S24. The read controller 212 stores data of the read logical volumes into the disk array device 300.

[Step S26] The read controller 212 determines whether the number of the remaining logical volumes to be read is 3. If the number of the remaining logical volumes is 4 or more, the read controller 212 returns to the step S26 to perform the read processing of the next logical volume. On the other hand, if the number of the remaining logical volumes is 3, the read controller 212 performs processing of the step S27.

[Step S27] The read controller 212 generates measurement information 250 for the LVG number of the logical volume group of the read target, in the RAM 202. The read controller 212 registers a starting line number in the "read line number" field and registers a predetermined initial value in the "read processing speed" field in the measurement information 250. Then, the processing proceeds to the step S31.

Figure 13:
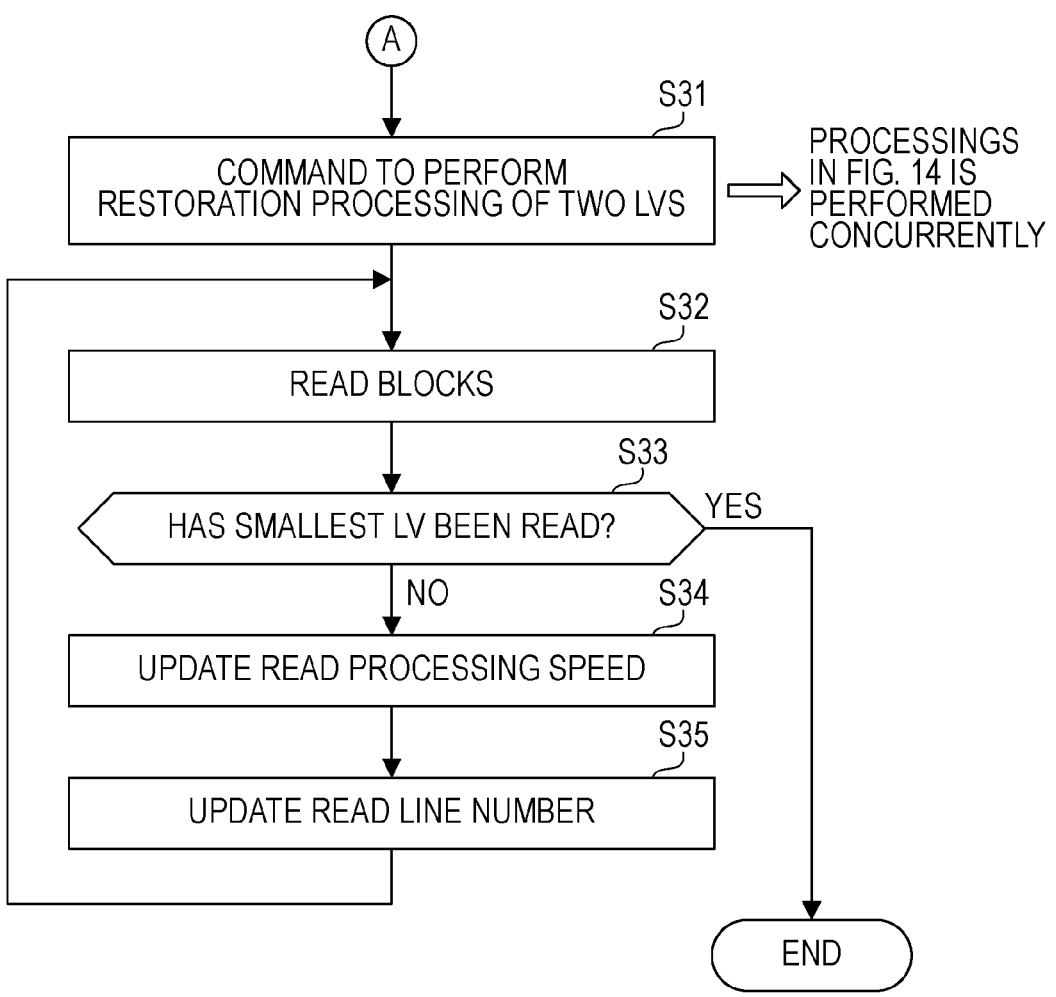
FIG. 13 is a flowchart illustrating a processing procedure (2) of the read controller.

FIG. 13 is a flowchart illustrating a processing procedure (2) of the read controller. Hereinafter, the processing illustrated in FIG. 13 is described in the order of step number.

[Step S31] The read controller 212 notifies the data restoration unit 213 of the LVG number of the logical volume group to be read, and the LV numbers of the last and second last logical volumes in the read order, and commands the data restoration unit 213 to perform restoration processing of the logical volume group of the notified LV numbers. Thus, processing by the read controller 212 at the step S32 and subsequent steps and processing by the data restoration unit 213 illustrated in FIG. 14 and described later are performed concurrently.

[Step S32] The read controller 212 selects blocks yet to be read among the blocks of the logical volumes of the read target, and reads data of the selected blocks from the magnetic tape in the tape library device 400. The read controller 212 stores the data of the read blocks into the disk array device 300. At this step, the logical volume of the read target is the smallest logical volume.

[Step S33] The read controller 212 determines whether all blocks included in the smallest logical volume have been read. If the reading has not been completed, the read controller 212 performs processing of the step S34. On the other hand, if the reading has been completed, the read controller 212 ends the processing.

[Step S34] The read controller 212 calculates the read processing speed from the starting block to the current block of the logical volume of the read target. The read controller 212 registers the calculated read processing speed in the "read processing speed" field of the measurement information 250.

At this step of S34, the read controller 212 may calculate, for example, a read speed from the starting logical volume to the current logical volume in the logical volume group, as information to be registered in the "read processing speed" field. In this case, even at the step S27, the read controller 212 registers the calculated read speed in the "read processing speed" field, but not a predetermined initial value.

[Step S35] The read controller 212 increments just by 1 the line number in the "read line number" field of the measurement information 250. Thereafter, the read controller 212 returns to the step S32 to perform reading of a next block.

Figure 14:
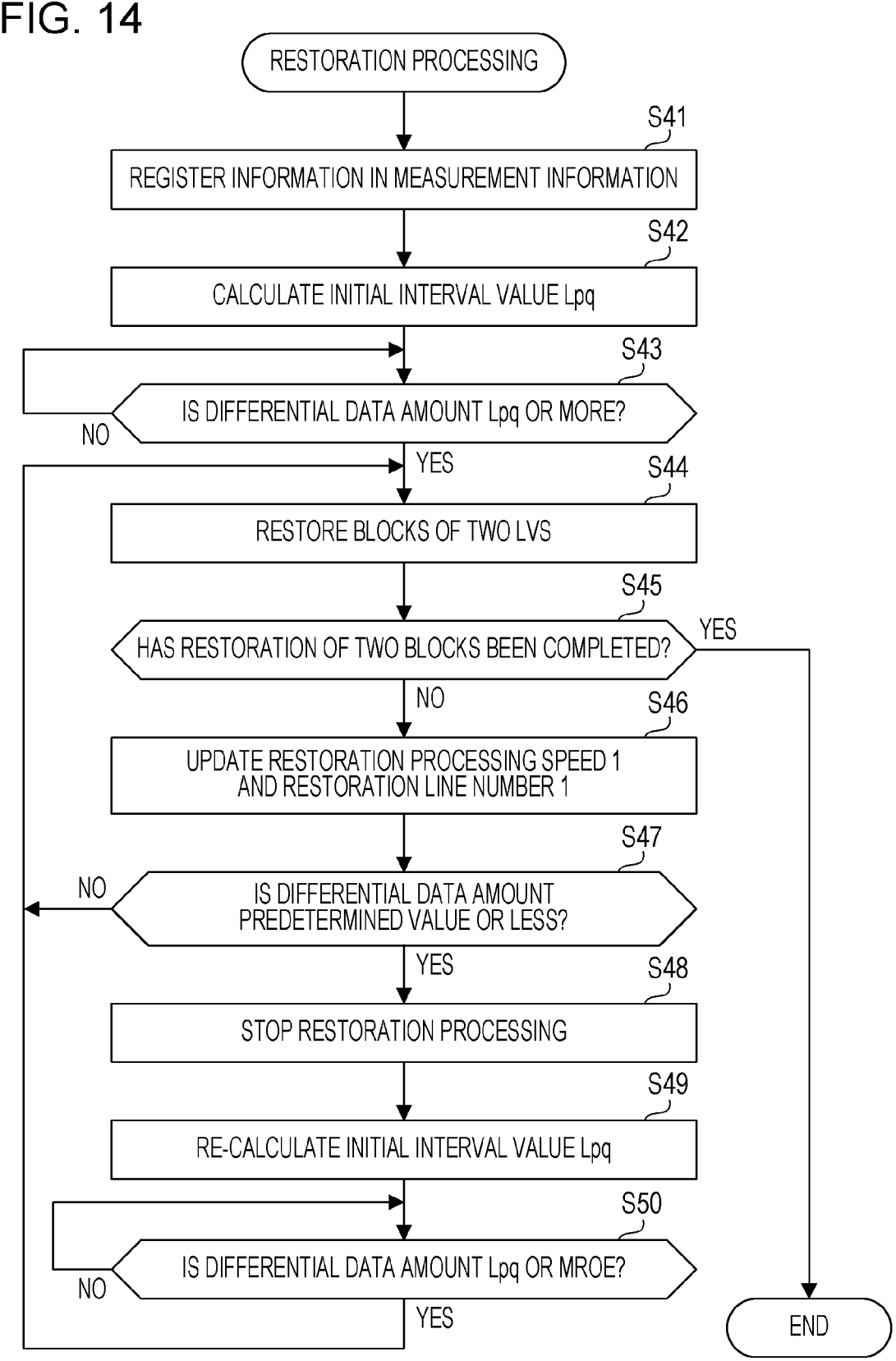
FIG. 14 is a flowchart illustrating a processing procedure of a data restoration unit according to the second embodiment.

FIG. 14 is a flowchart illustrating a processing procedure of a data restoration unit according to a second embodiment. Hereinafter, the processing illustrated in FIG. 14 is described in the order of step number.

Upon receiving a command from the read controller 212 to perform the restoration processing at the step S31 of FIG. 13, the data restoration unit 213 performs the processing of FIG. 14 concurrently with the read processing by the read controller 212.

[Step S41] The data restoration unit 213 registers a predetermined initial value in the "restoration processing speed" field in the measurement information 250 for a LVG number notified by the read controller 212. The data restoration unit 213 registers a starting line number of dummy data added to the smallest logical volume, in the "restoration line number" field of the measurement information 250. In the example of the logical volume group LVG0 illustrated in FIG. 11, the smallest logical volume among the logical volumes LV0 to LV2 is LV2. The starting line of the dummy data added to the logical volume LV2 is 10. Hence, 10 is registered in the "restoration line number 1" field.

The line number to be set in the "restoration line number 1" at this step represents the starting block of the data restoration processing using parities P and Q. That is, the data restoration unit 213 does not restore the blocks of each of two logical volumes to be restored in the order from the head block, but starts the restoration from a middle one of the blocks indicated by the line number in the "restoration line number 1" field.

[Step S42] The data restoration unit 213 calculates the initial interval value Lpq in accordance with Equation (1), and registers the value in the "initial interval value 1" field of the measurement information 250.

$$Lpq = Vr\{L3/Vr - Lmax/Vpq\} \qquad (1)$$

L3 is the size of the smallest logical volume among the logical volumes belonging to the logical volume group, the size being the size of a logical volume being read (in the example of FIG. 11, logical volume LV2). The data restoration unit 213 acquires L3, for example, from the "smallest LV size" field of the LVG information 241 in the LVG management table 240. The value of L3 becomes smaller every time a block of the smallest logical volume is read from the tape library device 400.

Vr is a measured read speed by the read controller 212 for a logical volume being currently read (that is, the smallest logical volume). The data restoration unit 213 acquires Vr from the "read processing speed" field of the measurement information 250.

Lmax is the size of the largest logical volume among the logical volumes belonging to the logical volume group of the read target, the size being the size of a larger logical volume of the restoration target (in the example of FIG. 11, logical volume LV0). The data restoration unit 213 acquires Lmax, for example, from the "LV size 1" field of the LVG information 241 in the LVG management table 240. The value of Lmax becomes smaller every time a block of the largest logical volume is restored.

Vpq is a measured value of the data restoration speed by the data restoration unit 213. The data restoration unit 213 acquires Vpq from the "restoration processing speed 1" field of the measurement information 250. At the initial stage, a predetermined initial value is registered in the "restoration processing speed 1" field. Thereafter, information in the "restoration processing speed 1" field is updated by the data restoration unit 213 as occasion calls.

In Equation (1), L3/Vr is an expected duration desired to read the smallest logical volume of the read target, and Lmax/Vpq is expected time duration desired to restore s largest logical volume of the restoration target. The initial interval value Lpq is a data amount corresponding to a difference between L3/Vr and Lmax/Vpq.

Since restoration processing using the parities P and Q is performed faster than read processing from a magnetic tape, Lmax/Vpq may become shorter than L3/Vr. Here, by adjusting the position of a line being restored by using the initial interval value Lpq, the data restoration unit 213 can control such that reading of the smallest logical volume from the magnetic tape and restoring of the largest logical volume end at substantially the same timing.

[Step S43] The data restoration unit 213 determines whether the differential data amount calculated by subtracting a remaining data amount yet to be read in the smallest logical volume of the read target from the size of the largest logical volume of the restoration target is equal to or larger than the initial interval value Lpq calculated at the step S42. If the differential data amount is equal to or larger than the initial interval value Lpq, the data restoration unit 213 performs processing of the step S44. On the other hand, the data restoration unit 213 is put in the standby mode until the differential data amount becomes equal to or larger than the initial interval value Lpq. When reading of the smallest logical volume further proceeds and the differential data amount becomes equal to or larger than the initial interval value Lpq, the data restoration unit 213 performs the processing of the step S44. When calculating the remaining data amount yet to be read in the smallest logical volume, the line number registered in the "read line number" field of the measurement information 250 is referred to, for example.

[Step S44] The data restoration unit 213 selects the same line number as the number in the "restoration line number 1" for blocks yet to be restored in the two logical volumes of the restoration target notified by the read controller 212. The data restoration unit 213 reads, from the disk array device 300, a block of the smallest logical volume and a block of each of the parities P and Q, the blocks having the same line number as the selected line number. By using data of each of read blocks, the data restoration unit 213 restores data of the blocks with the selected line number in the two logical volumes of the restoration target, and stores data of the restored blocks into the disk array device 300.

However, before the restoration target is shifted to the starting block of the logical volume, the data restoration unit 213 performs restoration by using dummy data for the smallest logical volume without using the data of the smallest logical volume read from the magnetic tape. Dummy data for the smallest logical volume may be data stored in the disk array device 300 in advance, or may be generated at this timing.

[Step S45] The data restoration unit 213 determines whether the two logical volumes of the restoration target have been restored entirely. If the two logical volumes have been restored, the data restoration unit 213 ends the processing. If there is a block yet to be restored among blocks in the two logical volumes, the data restoration unit 213 performs processing of the step S46.

[Step S46] The data restoration unit 213 calculates the restoration processing speed from the start of restoring the two logical volumes of the restoration target up to now. Depending on the calculated restoration processing speed, the data restoration unit 213 updates information in the "restoration processing speed 1" field of the measurement information 250.

The data restoration unit 213 increments just by 1 the line number in the "restoration line number 1" field of the measurement information 250. However, if the line number in the "restoration line number 1" field is the line number of the tail end of the largest logical volume, the data restoration unit 213 registers 0 as the line number in the "restoration line number 1" field. Thus, the restoration target is shifted to a starting line of the logical volume.

[Step S47] The data restoration unit 213 calculates a differential data amount by subtracting a remaining data amount yet to be read in the smallest logical volume from a remaining data amount yet to be restored in the largest logical volume. For calculating the remaining data amount yet to be restored, a line number registered in the "restoration line number 1" field of the measurement information 250 is referred to, for example. For calculating the remaining data amount yet to be read, a line number registered in the "read line number" field of the measurement information 250 is referred to, for example.

The data restoration unit 213 determines whether the calculated differential data amount is equal to or smaller than a predetermined differential setting. If the differential data amount is larger than the predetermined differential setting, the data restoration unit 213 proceeds to the step S44 and performs restoration processing of the next block. On the other hand, if the differential data amount is equal to or smaller than the predetermined differential setting, the data restoration unit 213 performs processing of the step S48.

The differential setting is preferably set to a value equal to or larger than the size of one block. This is because restoration of a block of the restoration target can be started only after completion of reading of a block of the same line number as the block of the restoration target.

At this step, instead of performing the above determination processing, the data restoration unit 213 may determine whether the number of lines of the restoration target reaches close to smaller than a predetermined number of lines of the current read target, and perform the processing of the step S48 if the number is close.

[Step S48] The data restoration unit 213 temporarily stops restoration processing of the two logical volumes of the restoration target.

[Step S49] The data restoration unit 213 re-calculates the initial interval value Lpq in accordance with Equation (1), and updates the "initial interval value 1" field of the measurement information 250 according to the calculated value. When performing the re-calculation, the data restoration unit 213 calculates a total size of blocks yet to be restored in the largest logical volume, and substitutes the calculated value in Lmax of Equation (1). The data restoration unit 213 calculates the total size of blocks yet to be read in a third logical volume from the last in the read order (that is, the smallest logical volume being read by the read controller 212), and substitutes the calculated value in L3 of Equation (1). Further, the data restoration unit 213 substitutes values registered in "restoration processing speed 1" and "read processing speed" fields of the measurement information 250 respectively into Vpq and Vr.

[Step S50] The data restoration unit 213 calculates a differential data amount by subtracting a remaining data amount of a block yet to be read in the smallest logical volume from a remaining data amount yet to be restored in the largest logical volume in accordance with the same procedure as the step S47. The data restoration unit 213 determines whether the calculated differential data amount is equal to or larger than the initial interval value Lpq calculated at the step S49. If the differential data amount is equal to or larger than the initial interval value Lpq, the data restoration unit 213 performs processing of the step S44. On the other hand, the data restoration unit 213 is put in the standby mode until the differential data amount becomes equal to or larger than the initial interval value Lpq. When the differential data amount becomes equal to or larger than the initial interval value Lpq, the data restoration unit 213 performs the processing of the step S44.

Through the processing of FIG. 14 described above, the data restoration unit 213 restores each of the largest and the second largest logical volumes from the middle thereof by using the parities P and Q and the dummy data. Then, after completion of restoration of the tail end block of each of logical volumes, the data restoration unit 213 continues to restore from the starting block of each of logical blocks by using the parities P and Q, and the data of the other logical volume (smallest logical volume) already stored into the disk array device 300 from the magnetic tape. Thus, all the data contained in each of the logical volumes can be restored.

Such restoration processing is performed concurrently with processing of reading the smallest logical volume from the magnetic tape to the disk array device 300.

Here, for example, restoration of the largest and the second largest logical volumes from the starting block of each of the logical volumes can be started only after reading of the smallest logical volume proceeds to some extent. In contrast, through the above processing, restoration starting time of the largest and the second largest logical volumes can be advanced by starting restoration from the middle of each of the logical volumes by using dummy data. Thus, concurrence of read processing from the magnetic tape and restoration processing using the parities P and Q can be improved (that is, time of parallel processing can be made longer). Consequently, time for entire processing of storing all data in a logical volume group requested to read into the disk array device 300 can be reduced.

Although, in the above example, a logical volume read third to the last in a logical volume group read from the tape library device 400 is the smallest logical volume, the logical volume read third to the last may be smaller than at least the second largest logical volume in the logical volume group. However, if a logical volume to be read third to the last is assumed to be the smallest logical volume, the number of blocks which can be restored by using dummy data will increase by a larger portion of dummy data's region than other logical volumes. Thereby, the timing of starting the restoration can be advanced.

Further, if a last logical volume in the reading order is assumed to be the largest logical volume, and a logical volume to be read third to the last is assumed to be the smallest logical volume, the number of blocks which can be restored by using dummy data will become max. In this case, the timing of starting restoration can be advanced, and the concurrence of read processing and restoration processing can be improved. Accordingly, time for entire processing of storing all desired data in the disk array device 300 can be reduced to the minimum.

Further, when a difference between a remaining data amount yet to be restored in the largest logical volume of the restoration target and a remaining data amount yet to be read from the magnetic tape becomes smaller than a predetermined differential setting, the data restoration unit 213 stops restoration processing. For example, unless the data restoration unit 213 stops restoration processing, a block of the restoration target may be ahead of a block of the read target. In this case, the data restoration unit 213 is unable to restore data by using the parities P and Q, and logical volumes already stored in the disk array device 300. To avert such a situation that data may not be restored by using the parities P and Q, and logical volumes already stored in the disk array device 300, the data restoration unit 213 stops restoration processing when the difference between the remaining data amounts becomes smaller than a predetermined differential setting.

Next, a processing example of reading the logical volume group LVG0 illustrated in FIG. 11 from the tape library device 400 and storing the same in the disk array device 300 is described with reference to FIG. 15 to FIG. 17. FIG. 15 illustrates specific examples (1) of a read processing and a restoration processing of a logical volume group according to the second embodiment. FIG. 16 illustrates specific examples (2) of a read processing and a restoration processing of a logical volume group according to the second embodiment. FIG. 17 illustrates specific examples (3) of a read processing and a restoration processing of a logical volume group according to the second embodiment.

The read controller 212 sets a processing order in such a manner that the smallest logical volume LV2 is read third to the last, the second large logical volume LV1 is read second to the last, and the largest logical volume LV0 is read at the last. As illustrated in state 1 of FIG. 15, the read controller 212 starts reading of the smallest logical volume LV2 from a magnetic tape in the tape library device 400. Further, the read controller 212 commands the data restoration unit 213 to perform restoration processing of logical volumes LV0 and LV1.

The data restoration unit 213 registers 10 as the starting line number of dummy data for the logical volume LV2, in the "restoration line number 1" field. The data restoration unit 213 calculates the initial interval value Lpq, and registers the value in the "initial interval value 1" field of the measurement information 250. The data restoration unit 213 waits until a differential data amount calculated by subtracting a remaining data amount yet to be read in the smallest logical volume LV2 from a data amount of the largest logical volume LV0 becomes equal to or larger than a data amount indicated by the initial interval value Lpq (state 1).

When read processing of lines of the read target by the read controller 212 further proceeds and the differential data amount becomes equal to or larger than the initial interval value Lpq, the data restoration unit 213 starts to restore data of blocks of logical volumes LV0 and LV1 of the line number 10 by using blocks of the parities P and Q with the same number as the line number 10 registered in the "restoration line number 1" field and blocks of dummy data for the logical volume LV2. In this way, write processing of the read controller 212 and restoration processing of the data restoration unit 213 are performed in parallel.

In the processing indicated in states 1 and 2, timing of starting restoration becomes earlier, for example, compared with a case where restoration is started from the starting block of each of logical volumes LV0 and LV1 by using the parities P and Q, and data of the logical volume LV2 already read. Accordingly, time for entire processing of storing all desired data in the disk array device 300 can be reduced.

After restoring blocks of logical volumes LV0 and LV1 of the line number 10, the data restoration unit 213 restores blocks of the logical volumes LV0 and LV1 in the ascending order (state 3). Specifically, data in the logical volume LV0 is restored up to blocks of line numbers 10 to 15. Data in the logical volume LV1 is restored up to blocks of line numbers 10 to 12.

After restoring blocks of the logical volume LV0 up to the line number of the tail end, the data restoration unit 213 starts to restore data of blocks of logical volumes LV0 and LV1 of the line number 0 by using blocks of the parities P and Q of a starting line number, and a block of the line number 0 in the logical volume LV2 already written into the disk array device 300 (state 4). Thereafter, while incrementing the line number by one, the data restoration unit 213 continues to restore logical volumes LV0 and LV1 by using blocks of the parities P and Q and a block of the logical volume LV2 already written into the disk array device 300.

The read controller 212 completes writing of blocks up to the line number 9 of the logical volume LV2 from the tape library device 400 to the disk array device 300 (state 5). Thereafter, the data restoration unit 213 restores data of blocks of logical volumes LV0 and LV1 with the line number 9 by using blocks of the parities P and Q with a same number as the line number 9 of the logical volume LV2. Then, all blocks of logical volumes LV0 and LV1 are restored (state 6).

However, in a process from states 2 to 5, the data restoration unit 213 stops restoration processing when a differential data amount calculated by subtracting a remaining data amount yet to be read in the smallest logical volume from a remaining data amount yet to be restored in the largest logical volume becomes smaller than a data amount indicated by the initial interval value Lpq. The data restoration unit 213 re-calculates the initial interval value Lpq by using Equation (1). When reading of the logical volume LV2 proceeds and the above differential data amount becomes equal to or larger than the re-calculated initial interval value Lpq, the data restoration unit 213 restarts restoration processing.

In this way, read processing by the read controller 212 and restoration processing by the data restoration unit 213 by using the dummy data for the logical volume LV2 and the parities P and Q are performed concurrently, and thereby, a time for storing data of all the logical volumes belonging to the logical volume group LVG0 into the disk array device 300 can be reduced.

Concurrently with reading of the logical volume LV2 from the tape library device 400 by the read controller 212 and restoration by the data restoration unit 213 by using the parities P and Q and the dummy data for the logical volume LV2, the data restoration unit 213 may further perform restoration by using the blocks of the logical volume V2 already stored in the disk array device 300 and parities P and Q.

Third Embodiment

Next, the third embodiment is described. Description is focused on differences from the second embodiment described above, and description of common items is omitted.

In the second embodiment, two logical volumes are restored simultaneously by using the blocks of dummy data and the blocks of the parities P and Q with the same line number. In contrast, in the third embodiment, data of two logical volumes are each individually restored in parallel by using blocks of dummy data and blocks of the parities P and Q with different line numbers.

Here, a system configuration of a storage system according to the third embodiment is the same as a storage system according to the second embodiment illustrated in FIG. 2. Also, a basic configuration of processing functions of the controller device 200 according to the third embodiment is the same as those illustrated in FIG. 5. Therefore, the same reference numerals and name as those in the second embodiment are used.

In the third embodiment, a read processing performed by the read controller 212 is the same as the second embodiment. In the third embodiment, a write processing by the read controller 212 and a restoration processing by the data restoration unit 213 are also performed concurrently. On the other hand, in the third embodiment, the restoration processing by the data restoration unit 213 is different from the second embodiment.

Figure 18:
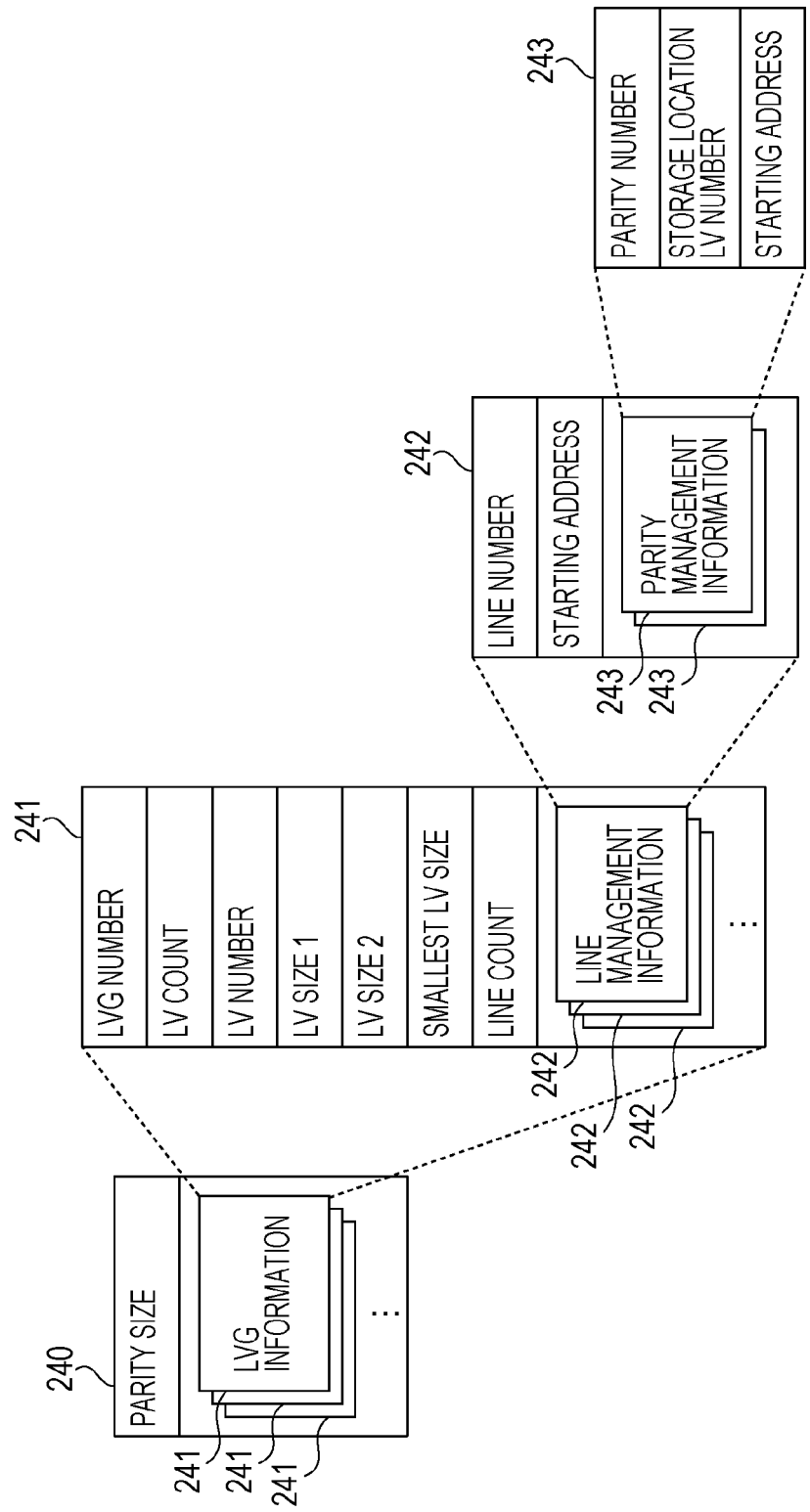
FIG. 18 illustrates an example (2) of the LV management table.

Next, items added to the tables in the third embodiment are described. FIG. 18 illustrates an example (2) of the LVG management table. LVG information 241 included in the LVG management table 240 has an additional field of "LV size 2". Size of the second largest logical volume among the logical volumes belonging to an associated logical volume group is registered in the "LV size 2" field.

Figure 19:
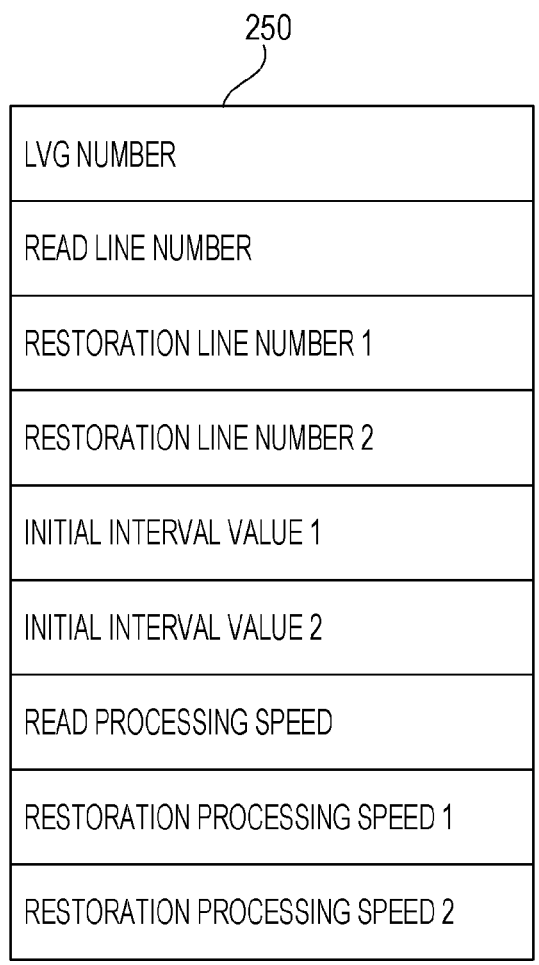
FIG. 19 illustrates an example (2) of the measurement information.

FIG. 19 illustrates an example (2) of the measurement information. "Restoration line number 2", "initial interval value 2", and "restoration processing speed 2" fields are added to the measurement information 250.

Here, fields for registration items different from the second embodiment are described as well. A line number of the restoration target in the largest logical volume among the logical volumes belonging to the logical volume group is registered in the "restoration line number 1" field. A line number of the restoration target in the second largest logical volume among the logical volumes belonging to the logical volume group is registered in the "restoration line number 2" field.

A data amount used for restoring the largest logical volume among the logical volumes belonging to the logical volume group is registered in the "initial interval value 1" field. Data amount used for restoring the second largest logical volume among the logical volumes belonging to the logical volume group is registered in the "initial interval value 2" field.

A measured processing speed of restoring the largest logical volume among logical volumes belong to the logical volume group is registered in the "restoration processing speed 1" field. A measured processing speed of restoring the second largest logical volume among the logical volumes belonging to the logical volume group is registered in the "restoration processing speed 2" field.

Next, a processing by the data restoration unit 213 to restore the largest logical volume among the logical volumes belonging to the logical volume group is described.

Figure 20:
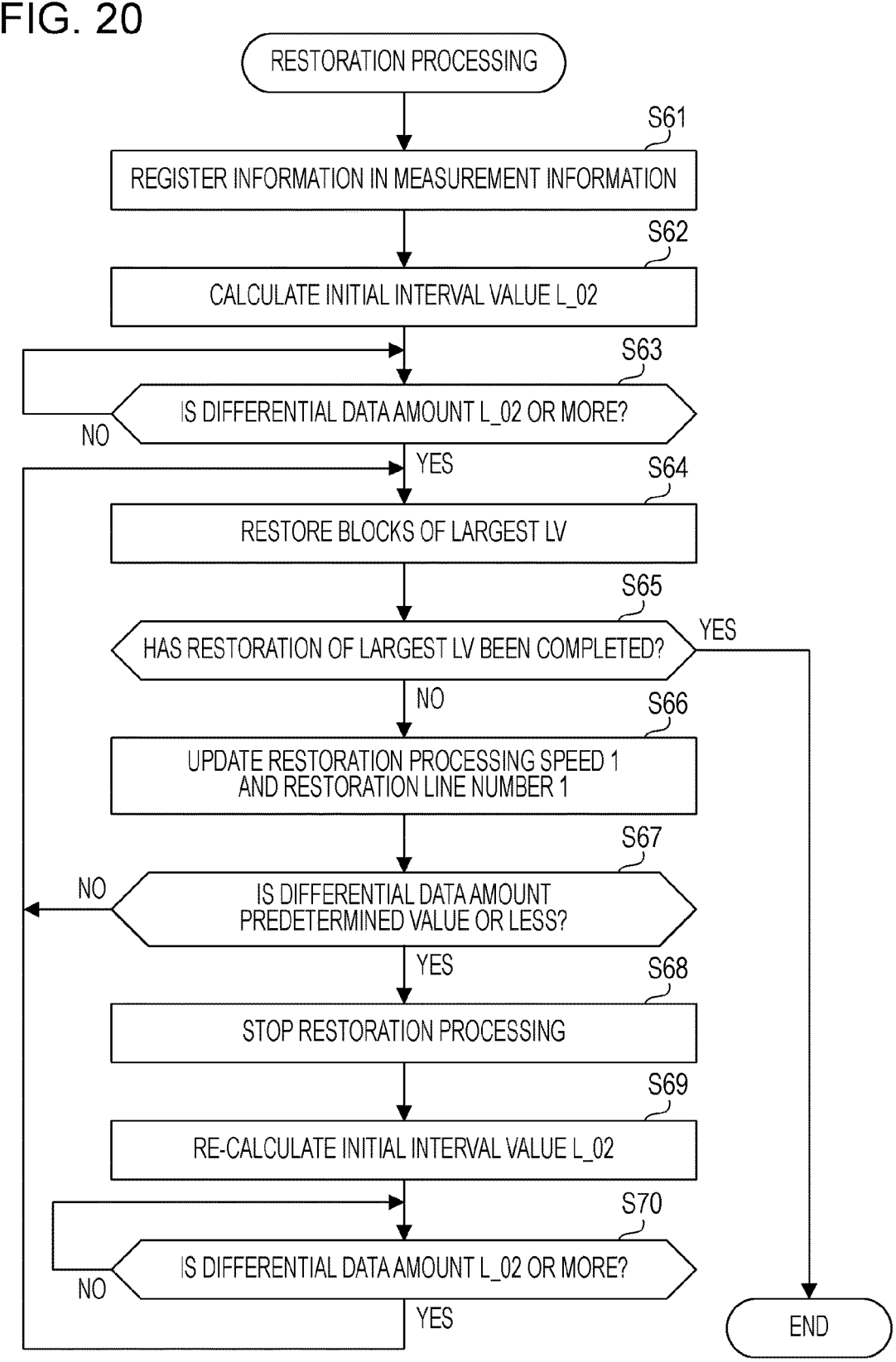
FIG. 20 is a flowchart illustrating a processing procedure (1) of a data restoration unit according to a third embodiment.

FIG. 20 is a flowchart illustrating a processing procedure (1) of the data restoration unit according to the third embodiment. Hereinafter, the processing illustrated in FIG. 20 is described in the order of step number.

Upon receiving a command from the read controller 212 to perform a restoration processing at the step S31 of FIG. 13, the data restoration unit 213 performs processing of FIG. 20 concurrently with a read processing by the read controller 212.

[Step S61] The data restoration unit 213 registers a predetermined initial value in the "restoration processing speed 1" field in the measurement information 250 for a LVG number notified by the read controller 212. The data restoration unit 213 registers a starting line number of dummy data for the smallest logical volume, in the "restoration line number" field of the measurement information 250.

[Step S62] The data restoration unit 213 calculates the initial interval value L_02 in accordance with Equation (2), and registers the value in the "initial interval value 1" field of the measurement information 250.

$$L\_02 = Vr\{L3/Vr - Lmax/V1\} \quad (2)$$

Description of Vr, L3 and Lmax is omitted as being the same as in Equation (1).

V1 is a measured value of the data restoration speed by the data restoration unit 213 when restoring the largest logical volume. The data restoration unit 213 acquires V1 from the "restoration processing speed 1" field of the measurement information 250. At the initial stage, a predetermined initial value is registered in the "restoration processing speed 1" field. Thereafter, information in the "restoration processing speed 1" field is updated by the data restoration unit 213 as occasion calls.

[Step S63] The data restoration unit 213 determines whether the differential data amount calculated by subtracting a remaining data amount yet to be read in the smallest logical volume of the restoration target from a data amount of the largest logical volume of the restoration target is equal to or larger than the initial interval value L_02 calculated at the step S62. If the differential data amount is equal to or larger than the initial interval value L_02, the data restoration unit 213 performs processing of the step S64. On the other hand, the data restoration unit 213 is put in the standby mode until the differential data amount becomes equal to or larger than the initial interval value L_02. When the differential data amount becomes equal to or larger than the initial interval value L_02, the data restoration unit 213 performs the processing of the step S64.

[Step S64] The data restoration unit 213 selects the same line number as the number in the "restoration line number 1" for the blocks yet to be restored in the largest logical volume of the restoration target notified by the read controller unit 212. The data restoration unit 213 reads a block of the smallest logical volume and blocks of the parities P and Q with the same line number as the selected line number, from the disk array device 300. The data restoration unit 213 restores data of the block with the selected line number in the largest logical volume by using data of read blocks, and stores the restored block into the disk array device 300.

However, before the restoration target is shifted to the starting block of the logical volume, the data restoration unit 213 performs restoration by using dummy data for the smallest logical volume without using the data of the smallest logical volume read from the magnetic tape.

[Step S65] The data restoration unit 213 determines whether the largest logical volume has been restored entirely. If the largest logical volume has been restored, the data restoration unit 213 ends the processing. If there is a block yet to be restored among blocks in the largest logical volume, the data restoration unit 213 performs processing of the step S66.

[Step S66] The data restoration unit 213 calculates the restoration processing speed from start of restoring the largest logical volume up to now. Depending on the calculated restoration processing speed, the data restoration unit 213 updates information in the "restoration processing speed 1" field of the measurement information 250.

The data restoration unit 213 increments just by 1 the line number in the "restoration line number 1" field of the measurement information 250. However, if the line number in the "restoration line number 1" field is the line number of the tail end of the largest logical volume, the data restoration unit 213 registers 0 as the line number in the "restoration line number 1" field. Thus, the restoration target is shifted to a starting line of the logical volume.

[Step S67] The data restoration unit 213 calculates a differential data amount by subtracting a remaining data amount of a block yet to be read in the smallest logical volume from a remaining data amount yet to be restored in the largest logical volume. When calculating the remaining data amount yet to be restored, a line number registered in the "restoration line number 1" field of the measurement information 250 is referred to, for example. When calculating the remaining data amount yet to be read, a line number registered in the "read line number" field of the measurement information 250 is referred to, for example.

The data restoration unit 213 determines whether the calculated differential data amount is equal to or smaller than a predetermined differential setting. If the differential data amount is larger than the predetermined differential setting, the data restoration unit 213 proceeds to the step S64 and performs restoration processing of a next block. On the other hand, if the differential data amount is smaller than the predetermined differential setting, the data restoration unit 213 performs processing of the step S68.

[Step S68] The data restoration unit 213 temporarily stops restoration processing of the largest logical volume.

[Step S69] The data restoration unit 213 re-calculates the initial interval value L_02 in accordance with Equation (2), and updates the "initial interval value 1" field of the measurement information 250 according to the calculated value. When performing the re-calculation, the data restoration unit 213 calculates total size of a block yet to be restored in the largest logical volume, and substitutes the calculated value in Lmax of Equation (2). The data restoration unit 213 calculates total size of blocks yet to be read in a third logical volume from the last in the read order (that is, the smallest logical volume being read by the read controller 212), and substitutes the calculated value in L3 of Equation (2). Further, the data restoration unit 213 substitutes values registered in "restoration processing speed 1" and "read processing speed" fields of the measurement information 250 respectively into V1 and Vr.

[Step S70] The data restoration unit 213 calculates a differential data amount by subtracting a remaining data amount yet to be read in the smallest logical volume from a remaining data amount yet to be restored in the largest logical volume in accordance with the same procedure as the step S67. The data restoration unit 213 determines whether the calculated differential data amount is equal to or larger than the initial interval value L_02 calculated at the step S69. If the differential data amount is equal to or larger than the initial interval value L_02, the data restoration unit 213 performs the processing of the step S64. On the other hand, the data restoration unit 213 is put in the standby mode until the differential data amount becomes equal to or larger than the initial interval value L_02. When the differential data amount becomes equal to or larger than the initial interval value L_02, the data restoration unit 213 performs the processing of the step S64.

In this way, the largest logical volume is restored by the data restoration unit 213.

Next, processing of restoring the second largest logical volume among the logical volumes belonging to the logical volume group is described.

Figure 21:
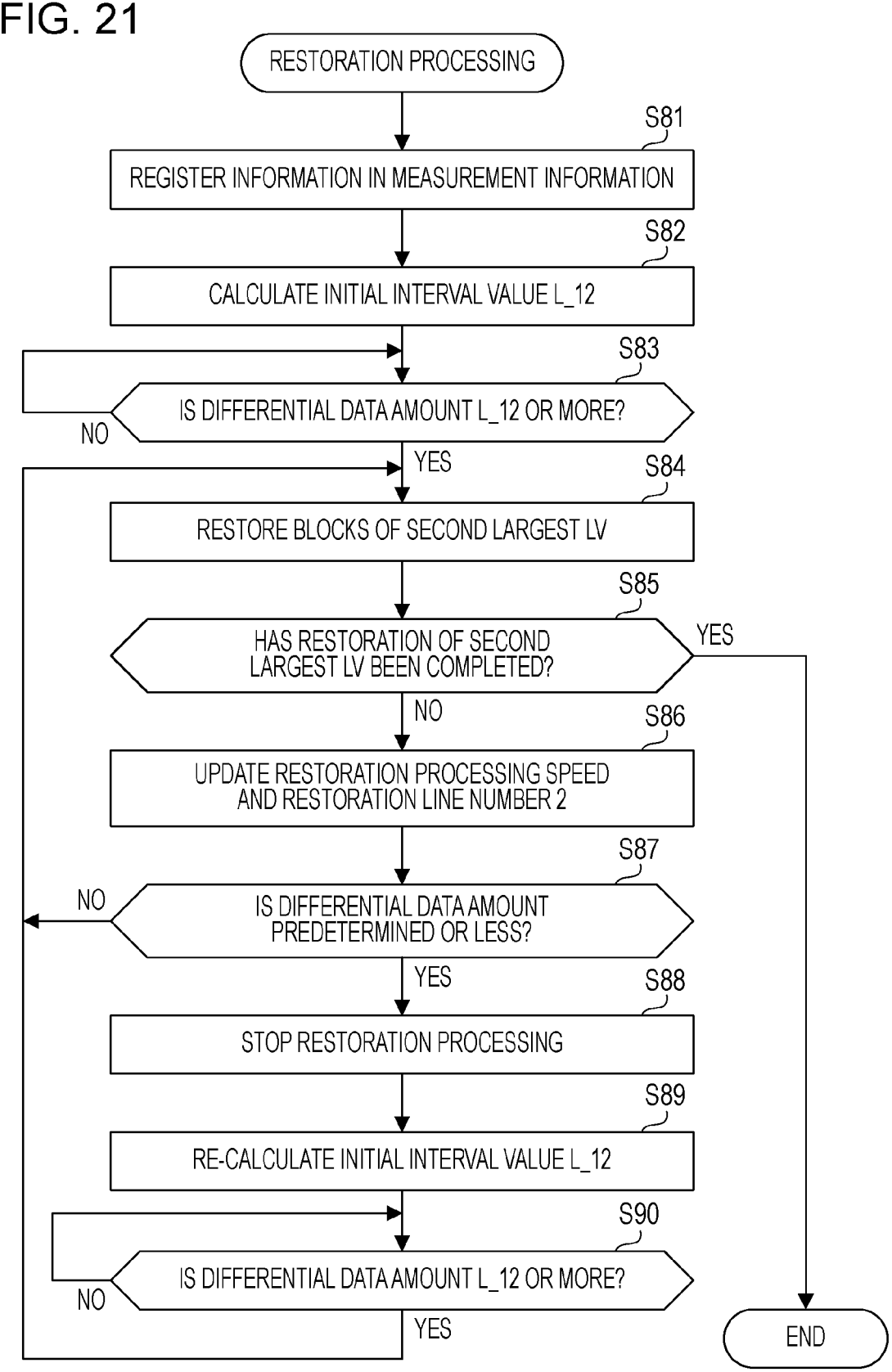
FIG. 21 is a flowchart illustrating a processing procedure (2) of the data restoration unit according to the third embodiment.

FIG. 21 is a flowchart illustrating a processing procedure (2) of the data restoration unit according to a third embodiment. Hereinafter, the processing illustrated in FIG. 21 is described in the order of step number.

Upon receiving a command from the read controller 212 to perform restoration processing at the step S31 of FIG. 13, the data restoration unit 213 performs the processing of FIG. 21 concurrently the read processing by the read controller 212 and the restoration processing of the largest logical volume illustrated in FIG. 20.

[Step S81] The data restoration unit 213 registers a predetermined initial value in the "restoration processing speed 2" field in the measurement information 250 for a LVG number notified by the read controller 212. The data restoration unit 213 registers a starting line number of dummy data for the smallest logical volume, in the "restoration line number 2" field of the measurement information 250.

[Step S82] The data restoration unit 213 calculates the initial interval value L_12 in accordance with Equation (3), and registers the value in the "initial interval value 2" field of the measurement information 250.

$$L\_12 = Vr\{L3/Vr - L2/V2\} \quad (3)$$

Description of Vr and L3 is omitted as being the same as in Equation (1).

L2 is the size of the second largest logical volume among the logical volumes belonging to the logical volume group. The data restoration unit 213 acquires L2, for example, from the "LV size 2" field of the LVG information 241 in the LVG management table 240. The value of L2 becomes smaller every time a block of the second largest logical volume is restored.

V2 is a measured value of the data restoration speed by the data restoration unit 213 when restoring the second largest logical volume. The data restoration unit 213 acquires V2 from the "restoration processing speed 2" field of the measurement information 250. At the initial stage, a predetermined initial value is registered in the "restoration processing speed 2" field. Thereafter, information in the "restoration processing speed 2" field is updated by the data restoration unit 213 as occasion calls.

[Step S83] The data restoration unit 213 determines whether the differential data amount calculated by subtracting a remaining data amount yet to be read in the smallest logical volume of the read target from a data amount of the second largest logical volume of the restoration target is equal to or larger than the initial interval value L_12 calculated at the step S82. If the differential data amount is equal to or larger than the initial interval value L_12, the data restoration unit 213 performs processing of the step S84. On the other hand, the data restoration unit 213 is put in the standby mode until the differential data amount becomes equal to or larger than the initial interval value L_12. When the differential data amount becomes equal to or larger than the initial interval value L_12, the data restoration unit 213 performs the processing of the step S84.

[Step S84] The data restoration unit 213 selects the same line number as the number in the "restoration line number 2" for blocks yet to be restored in the second largest logical volume of the restoration target notified by the read controller 212. The data restoration unit 213 reads a block of the smallest logical volume and the blocks of the parities P and Q with the same line number as the selected line number, from the disk array device 300. The data restoration unit 213 restores data of a block with the selected line number in the second largest logical volume by using data of read blocks, and stores the restored block into the disk array device 300.

However, before the restoration target is shifted to the starting block of the logical volume, the data restoration unit 213 performs restoration by using dummy data for the smallest logical volume without using the data of the smallest logical volume read from the magnetic tape.

[Step S85] The data restoration unit 213 determines whether the second largest logical volume has been restored entirely. If the second largest logical volume has been restored, the data restoration unit 213 ends the processing. If there is a block yet to be restored among blocks in the second largest logical volume, the data restoration unit 213 performs processing of the step S86.

[Step S86] The data restoration unit 213 calculates the restoration processing speed from start of restoring the second largest logical volume up to now. Depending on the calculated restoration processing speed, the data restoration unit 213 updates information in the "restoration processing speed 2" field of the measurement information 250.

The data restoration unit 213 increments just by 2 the line number in the "restoration line number 1" field of the measurement information 250. However, if the line number in the "restoration line number 2" field is the line number of the tail end of the second largest logical volume, the data restoration unit 213 registers 0 as the line number in the "restoration line number 2" field. Thus, the restoration target is shifted to a starting line of the logical volume.

[Step S87] The data restoration unit 213 calculates a differential data amount by subtracting a remaining data amount yet to be read in the smallest logical volume from a remaining data amount yet to be restored in the second largest logical volume. When calculating the remaining data amount of a block yet to be restored, a line number registered in the "restoration line number 2" field of the measurement information 250 is referred to, for example. When calculating the remaining data amount of a block yet to be read, a line number registered in the "read line number" field of the measurement information 250 is referred to, for example.

The data restoration unit 213 determines whether the calculated differential data amount is equal to or smaller than a predetermined differential setting. If the differential data amount is larger than the predetermined differential setting, the data restoration unit 213 proceeds to the step S84 and performs restoration processing of a next block. On the other hand, if the differential data amount is smaller than the predetermined differential setting, the data restoration unit 213 performs processing of the step S88.

[Step S88] The data restoration unit 213 temporarily stops restoration processing of the second largest logical volume.

[Step S89] The data restoration unit 213 re-calculates the initial interval value L_12 in accordance with Equation (3), and updates the "initial interval value 2" field of the measurement information 250 according to the calculated value. When performing the re-calculation, the data restoration unit 213 calculates a total size of blocks yet to be restored in the second largest logical volume, and substitutes the calculated value in L2 of Equation (3). The data restoration unit 213 calculates the total size of blocks yet to be read among blocks of a third logical volume from the last in the read order (that is, the smallest logical volume being read by the read controller 212), and substitutes the calculated value in L3 of Equation (2). Further, the data restoration unit 213 substitutes values registered in "restoration processing speed 2" and "read processing speed" fields of the measurement information 250 respectively into V2 and Vr.

[Step S90] The data restoration unit 213 calculates a differential data amount by subtracting a remaining data amount yet to be read in the smallest logical volume from a remaining data amount yet to be restored in the second largest logical volume in accordance with the same procedure as the step S87. The data restoration unit 213 determines whether the calculated differential data amount is equal to or larger than the initial interval value L_12 calculated at the step S89. If the differential data amount is equal to or larger than the initial interval value L_12, the data restoration unit 213 performs processing of the step S84. On the other hand, the data restoration unit 213 is put in the standby mode until the differential data amount becomes equal to or larger than the initial interval value L_12. When the differential data amount becomes equal to or larger than the initial interval value L_12, the data restoration unit 213 performs the processing of the step S84.

In this way, the second largest logical volume is restored by the data restoration unit 213.

Next, a processing example of reading the logical volume group LVG0 illustrated in FIG. 11 from the tape library device 400 and storing the same in the disk array device 300 is described with reference to FIG. 22 to FIG. 25. FIG. 22 illustrates specific examples (1) of the read processing and the restoration processing of the logical volume group according to the third embodiment. FIG. 23 illustrates specific examples (2) of the read processing and the restoration processing of the logical volume group according to the third embodiment. FIG. 24 illustrates specific examples (3) of the read processing and the restoration processing of the logical volume group according to the third embodiment.

FIG. 25 illustrates specific examples (4) of the read processing and the restoration processing of the logical volume group according to the third embodiment.

The read controller 212 sets a processing order in such a manner that the smallest logical volume LV2 is read at the third position from the last, the second large logical volume LV1 is read at the second position from the last, and the largest logical volume LV0 is read at the last. As illustrated in a state 11 of FIG. 22, the read controller 212 starts reading of the smallest logical volume LV2 from a magnetic tape in the tape library device 400. Further, the read controller 212 commands the data restoration unit 213 to perform restoration processing of the logical volumes LV0, LV1.

The data restoration unit 213 registers 10 as the starting line number of dummy data for the logical volume LV2, in the "restoration line number 1" field. The data restoration unit 213 calculates the initial interval value L_02, and registers the value in the "initial interval value 1" field of the measurement information 250. The data restoration unit 213 waits until a differential data amount calculated by subtracting a remaining data amount yet to be read in the smallest logical volume LV2 from a data amount of the largest logical volume LV0 becomes equal to or larger than a data amount indicated by the initial interval value L_02. The data restoration unit 213 calculates the initial interval value L_12, and registers the value in the "initial interval value 2" field of the measurement information 250. The data restoration unit 213 waits until a differential data amount calculated by subtracting a remaining data amount yet to be read in the smallest logical volume from a data amount of the largest logical volume LV1 becomes equal to or larger than a data amount indicated by the initial interval value L_12 (state 11).

When lines of the read target by the read controller 212 further proceeds and the differential data amount for the logical volume V0 becomes equal to or larger than the initial interval value L_02, the data restoration unit 213 starts to restore data of the blocks of the logical volume LV0, by using the blocks of the parities P and Q, and the block of dummy data for the logical volume LV2 with the same number as the line number 10 registered in the "restoration line number 1" field. Thereafter, the data restoration unit 213 continues to restore data toward the end of the logical volume LV0.

In the processing indicated in the states 12, timing of starting restoration of the logical volume LV2 becomes earlier, for example, than in a case where restoration is started from the starting block of the logical volume LV0 by using the parities P and Q, and data of the logical volume LV2 already read. Accordingly, time desired for entire processing of storing all desired data in the disk array device 300 can be reduced.

Further, when the differential data amount for the logical volume LV1 becomes equal to or larger than the initial interval value L_12, the data restoration unit 213 starts to restore data of blocks of the logical volume LV1 of the line number 10 by using the blocks of the parities P and Q and the block of dummy data for the logical volume LV2 with the same number as the line number 10 registered in the "restoration line number 2" field (state 13). In this way, write processing of the read controller 212 and restoration processing of the data restoration unit 213 are performed in parallel.

In the processing indicated in the states 13, timing of starting restoration of the logical volume LV1 becomes earlier, for example, compared with a case where restoration is started from the starting block of the logical volume LV1 by using the parities P and Q, and data of the logical volume LV2 already read. Accordingly, time desired for entire processing of storing all desired data in the disk array device 300 can be reduced.

Further, entire processing time for storing all desired data into the disk array device 300 can be reduced to the minimum by starting restoration from the restoration target of the logical volume LV0 or the logical volume LV1, whichever larger.

The data restoration unit 213 restores blocks of the logical volume LV0 up to the line number 15. Further, the data restoration unit 213 restores blocks of the logical volume LV1 up to the line number 12 (state 14).

After restoring blocks of the logical volume LV0 up to the tail end line number 15, the data restoration unit 213 starts to restore data of the block of the logical volume LV0 in the line number 0 by using the blocks of the parities P and Q of a starting line number, and blocks in the line number 0 of the logical volume LV2 already written into the disk array device 300 (state 15). Thereafter, the data restoration unit 213 continues to restore the logical volume LV0 while incrementing the line number by one.

The read controller 212 ends processing of writing data of the logical volume LV2 into the disk array device 300. After restoring blocks of the logical volume LV1 up to the rearmost line number 12, the data restoration unit 213 starts to restore data of blocks of the logical volume LV1 in the line number 0 by using the blocks of the parities P and Q of a starting line number, and the block with the line number 0 of the logical volume LV2 already written into the disk array device 300 (state 16). Thereafter, the data restoration unit 213 continues to restore the logical volume LV1 while incrementing the line number by one.

The data restoration unit 213 restores blocks of the logical volume LV0 in the line number 9 by using the block with the line number 9 of the logical volume LV2, and the blocks of the parities P and Q with the same number. Then, all the blocks of the logical volume LV0 are restored (state 17).

The data restoration unit 213 restores blocks of the logical volume LV1 in the line number 9 by using the block with the line number 9 of the logical volume LV2, and the blocks of the parities P and Q with the same number. Then, all blocks of the logical volume LV1 are restored (state 18).

However, in a duration from the state 12 until reading of the logical volume LV2 completes, the data restoration unit 213 stops restoration processing of the logical volume LV0 when a differential data amount calculated by subtracting a remaining data amount yet to be read in the smallest logical volume from a remaining data amount yet to be restored in the largest logical volume becomes smaller than a data amount indicated by the initial interval value $L\_02$. The data restoration unit 213 re-calculates the initial interval value $L\_02$ by using Equation (2). When reading of the logical volume LV2 proceeds and the above differential data amount becomes larger than the re-calculated initial interval value $L\_02$, the data restoration unit 213 restarts restoration processing of the logical volume LV0. This averts occurrence of the situation that the logical volume LV0 is disabled to be restored by using the parities P and Q, and data of the logical volume LV2 already stored in the disk array device 300.

Similarly, in a duration from the state 12 until reading of the logical volume LV2 completes, the data restoration unit 213 stops restoration processing of the logical volume LV1 when a differential data amount calculated by subtracting a remaining data amount yet to be read in the smallest logical volume from a remaining data amount yet to be restored in the largest logical volume becomes smaller than a data amount indicated by the initial interval value $L\_12$. The data restoration unit 213 re-calculates the initial interval value $L\_12$ by using Equation (3). When reading of the logical volume LV2 proceeds and the above differential data amount becomes equal to or larger than the re-calculated initial interval value $L\_12$, the data restoration unit 213 restarts restoration processing of the logical volume LV1. This averts occurrence of the situation that the logical volume LV1 is disabled to be restored by using the parities P and Q, and the data of the logical volume LV2 already stored in the disk array device 300.

Processing functions of the storage controller 10 and the controller device 200 in above embodiments can be implemented by a computer. In such a case, the above processing functions are implemented on a computer when a program stating process details of functions performed by each of communication tape library devices is executed by the computer. The program stating the process details may be recorded in a computer readable recording medium. The computer readable recording medium includes a magnetic storage unit, an optical disk, a magneto-optical recording medium, and a semiconductor memory. The magnetic storage unit includes a hard disk drive (HDD), a flexible disk (FD), and a magnetic tape. The optical disk includes a digital versatile disc (DVD), a DVD-RAM, a compact disc read only memory (CD-ROM), and CD-R (Recordable)/RW (Rewritable). The magneto-optical recording medium includes a magneto-optical disk (MO).

When distributing a program, a portable recording medium such as, for example, a DVD or CD-ROM in which the program is recorded is marketed. Also, a program may be stored in a storage unit of a server computer and then transferred to the other computer via a network.

A computer performing a program stores, for example, a program recorded in a portable recording medium or a program transferred from a sub-computer, into its storage unit. Then, the computer reads the program from its storage unit and performs a processing according to the program. Also, the computer may read a program directly from a portable recording medium and performs a processing according to the program. The computer also may perform a processing according to a received program every time the program is transferred from a sub-computer connected thereto via a network.

The present embodiment is described above in accordance with the illustrated embodiments. However, the present embodiment is not limited thereto, and configuration of individual components may be replaced by any configuration having similar functions. Further, any other structures and processes may be added to the present embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage controller comprising:
 a processor configured to
  execute a parity calculation process that includes:
   adding, when writing n sets of data (n is an integer of three or more) into a first storage device, dummy data to other sets of data except for a first set of data having a largest size among the n sets of data such that sizes of other sets of data become equal to the size of the first set of data,
calculating (n−1) parities based on the first set of data and the other sets of data to which the dummy data is added, and
storing the (n−1) parities into a second storage device; and
execute a control process that includes:
concurrently performing, when reading the n sets of data from the first storage device, a processing of reading a second set of data having a smallest size among the n sets of data from the first storage device and a processing of restoring each of two or more sets of data in the n sets of data except for the second set of data, by using the (n−1) parities and the dummy data, wherein
the processor is configured to perform, after completing part of the processing of restoring the two or more sets of data by using the (n−1) parities and the dummy data, a processing of restoring a remaining region yet to be restored in each of the two or more sets of data by using the (n−1) parities and data of the second set of data already read from the first storage device, in parallel with the processing of reading, and
the processor is configured to temporarily stop the processing of restoring the two or more sets of data when a differential value calculated by subtracting the size of data of the second set of data yet to be read from the first storage device, from the size of data yet to be restored in the set of data having the largest size among the two or more sets of data is equal to or smaller than a predetermined value.

2. The storage controller according to claim 1, wherein the processor is configured to calculate, after temporarily stopping the processing of restoring the two or more sets of data, a threshold value by using the size of data yet to be restored in the set of data having the largest size, restoration processing speed of the two or more sets of data, the size of data of the second set of data yet to be read from the first storage device, and read processing speed of the second set of data, and the processor is configured to resume the processing of restoring of the two or more sets of data when the differential value becomes equal to or larger than the threshold value.

3. The storage controller according to claim 1, wherein the processor is configured to write m sets of data including the n sets of data (m is an integer more than n) into the first storage device and read the written m sets of data from the first storage device, and the second set of data is data having a smallest size among the m sets of data.

4. The storage controller according to claim 3, wherein the first set of data is data having a largest size among the m sets of data.

5. The storage controller according to claim 1, wherein the processor is configured to perform the processing of restoring the two or more sets of data by using the (n−1) parities and the dummy data in descending order of data size of the data sets.

6. A storage system comprising:
a first storage device;
a second storage device; and
a processor configured to
execute a party calculation process that includes:
adding, when writing n sets of data (n is an integer of three or more) into a first storage device, dummy data to other sets of data except for a first set of data having a largest size among the n sets of data such that sizes of other sets of data become equal to the size of the first set of data,
calculating (n−1) parities based on the first set of data and the other sets of data to which the dummy data is added, and
storing the (n−1) parities into a second storage device,
execute a control process that includes:
concurrently performing, when reading the n sets of data from the first storage device, a processing of reading a second set of data having a smallest size among the n sets of data from the first storage device and a processing of restoring each of two or more sets of data in the n sets of data except for the second set of data, by using the (n−1) parities and the dummy data, wherein
the processor is configured to perform, after completing part of the processing of restoring the two or more sets of data by using the (n−1) parities and the dummy data, a processing of restoring a remaining region yet to be restored in each of the two or more sets of data by using the (n−1) parities and data of the second set of data already read from the first storage device, in parallel with the processing of reading, and
the processor is configured to temporarily stop the processing of restoring the two or more sets of data when a differential value calculated by subtracting the size of data of the second set of data yet to be read from the first storage device, from the size of data yet to be restored in the set of data having the largest size among the two or more sets of data is equal to or smaller than a predetermined value.

7. A storage control method comprising:
when writing n sets of data (n is an integer of three or more) into a first storage device, using a computer,
adding dummy data to other sets of data except for a first set of data having a largest size among the n sets of data such that sizes of other sets of data become equal to the size of the first set of data,
calculating (n−1) parities based on the first set of data and the other sets of data to which the dummy data is added, and
storing the (n−1) parities into a second storage device,
when reading the n sets of data from the first storage device, using a computer,
concurrently performs a processing of reading a second set of data having a smallest size among the n sets of data from the first storage device and a processing of restoring each of two or more sets of data in the n sets of data except for the second set of data, by using the (n−1) parities and the dummy data, wherein
after completing part of the processing of restoring the two or more sets of data by using the (n−1) parities and the dummy data, the computer performs processing of restoring a remaining region yet to be restored in each of the two or more sets of data by using the (n−1) parities and data of the second set of data already read from the first storage device, in parallel with the processing of reading, and
the computer temporarily stops the processing of restoring the two or more sets of data when a differential value calculated by subtracting the size of data of the second set of data yet to be read from the first storage device, from the size of data yet to be restored in the set of data having the largest size among the two or more sets of data is equal to or smaller than a predetermined value.

8. The storage control method according to claim 7, wherein after temporarily stopping the processing of restoring the two or more sets of data, the computer calculates a threshold value by using the size of data yet to be restored in the set of data having the largest size, restoration processing speed of the two or more sets of data, the size of data of the second set of data yet to be read from the first storage device, and read processing speed of the second set of data, and, when the differential value becomes equal to or larger than the threshold value, resumes the processing of restoring the two or more sets of data.

9. The storage control method according to claim 7, wherein the computer writes m sets of data including the n sets of data (m is an integer more than n) into the first storage device, and reads the written m sets of data from the first storage device, and the second set of data is data having a smallest size among the m sets of data.

10. The storage control method according to claim 9, wherein the first set of data is data having a largest size among the m sets of data.

11. The storage control method according to claim 7, wherein the computer performs the processing of restoring the two or more sets of data by using the (n−1) parities and the dummy data in descending order of data size of the data sets.

* * * * *